United States Patent [19]
Maehara

[11] Patent Number: 5,966,562
[45] Date of Patent: Oct. 12, 1999

[54] FIXING DEVICE HAVING TEMPERATURE CONTROL MEANS

[75] Inventor: Shigeharu Maehara, Ikoma-gun, Japan

[73] Assignee: Sharp Kabushiki Kaisha, Osaka, Japan

[21] Appl. No.: 09/120,208

[22] Filed: Jul. 21, 1998

[30] Foreign Application Priority Data

Sep. 19, 1997 [JP] Japan ................................. 9-254613

[51] Int. Cl.$^6$ .................................................. G03G 15/20
[52] U.S. Cl. ............................ 399/69; 219/494; 399/45
[58] Field of Search .............................. 399/33, 43, 45, 399/67, 68, 69, 70, 389; 219/216, 490, 492, 494; 374/1

[56] References Cited

U.S. PATENT DOCUMENTS

| | | | |
|---|---|---|---|
| 3,937,921 | 2/1976 | Furuichi et al. | 219/494 |
| 5,367,369 | 11/1994 | Nakai et al. | 399/69 |
| 5,444,521 | 8/1995 | Tomoyuki et al. | 399/69 |
| 5,669,038 | 9/1997 | Kishimoto | 399/67 |
| 5,669,039 | 9/1997 | Ohtsuka et al. | 399/68 |
| 5,682,577 | 10/1997 | Kiyoi | 399/69 |
| 5,742,865 | 4/1998 | Yajima et al. | 399/43 |
| 5,747,774 | 5/1998 | Suzuki et al. | 219/216 |

FOREIGN PATENT DOCUMENTS

| | | |
|---|---|---|
| 55-089879 | 7/1980 | Japan . |
| 58-54365 | 3/1983 | Japan . |
| 1-171471 U | 5/1989 | Japan . |
| 6-118838 | 4/1994 | Japan . |

Primary Examiner—William Royer
Assistant Examiner—Sophia S. Chen
Attorney, Agent, or Firm—David G. Conlin; William J. Daley, Jr.

[57] ABSTRACT

Feature is a fixing device equipped in an image forming device enabling reduction of electronic noise and preventing hot-offset and fixing disorder. The fixing device includes a rotatable fixing roll, a heater for heating the fixing roll, a temperature detector for detecting the surface temperature of the fixing roll, and temperature control circuitry. The temperature control circuitry is for controlling the fixing roll surface to maintain a predetermined temperature by supplying a predetermined electric power to the heater, wherein the temperature of the fixing roll during continuous image forming operation is detected periodically by the temperature detector, and in correspondence to the difference between a fixed reference temperature and the detected temperature, controlling the electric power quantity to be supplied to the heater during a cycle by increasing or decreasing a half-wave unit cycle number of the commercial power source.

12 Claims, 14 Drawing Sheets

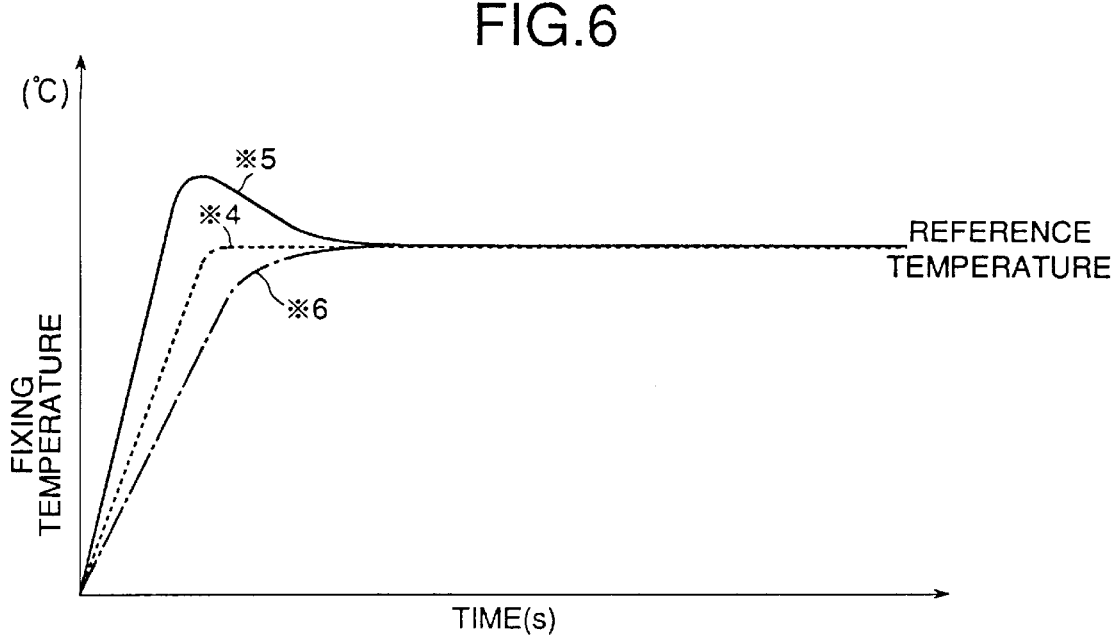
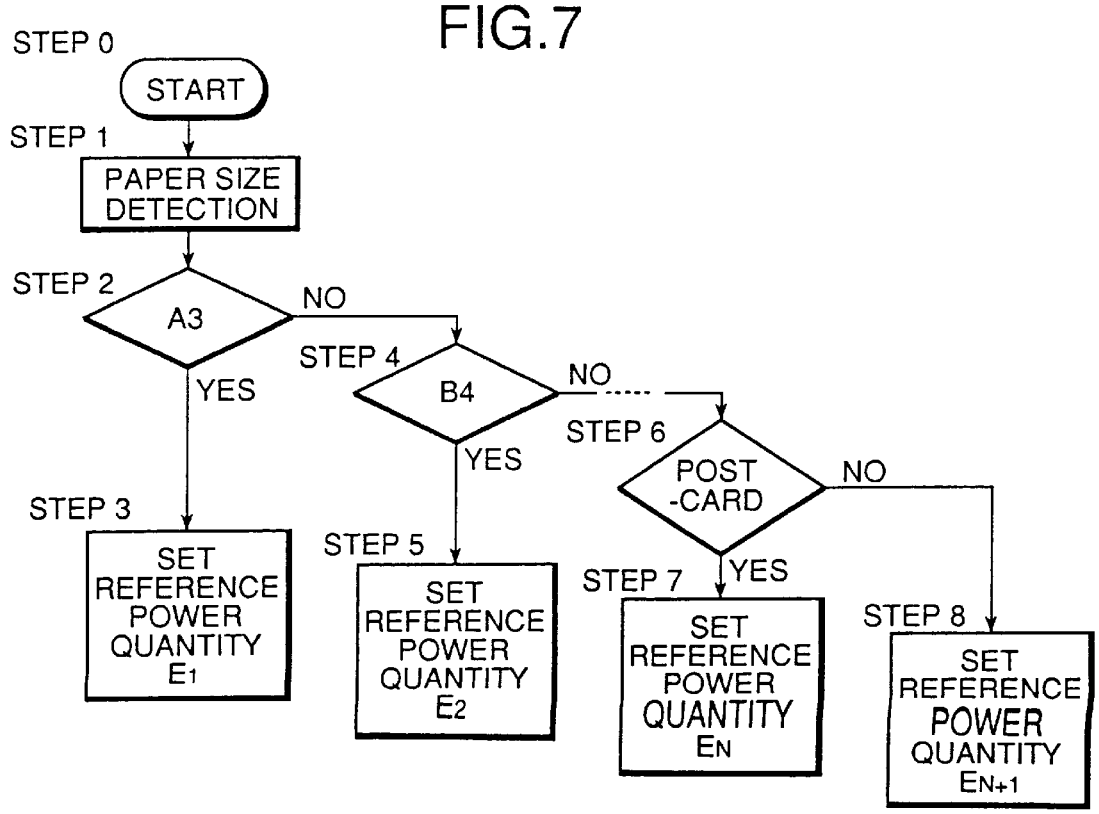

FIXING DEVICE HAVING TEMPERATURE CONTROL MEANS

BACKGROUND OF THE INVENTION

The present invention relates to an image forming device equipped with a fixing device for heat-fixing toner, such as analog or digital copying machines and facsimile machines, laser beam printers and the like utilizing an electrophotograph method.

In the prior art, the image forming device utilizing an electrophotograph method included forming a visible image by powder toner from a latent image formed on a photosensitive body, and transferring said visible image or toner image to a predetermined sheet of paper, and then melting the toner by heat and pressurizing the same, in order to fix the toner image onto the paper, thereby forming a permanently visible image.

The conventional control block for the fixing device comprises a fixing heater, a temperature detector, a fixing control circuit, a control circuit, a zero-cross circuit and the like.

An AC (alternating current) driven halogen lamp and the like are widely used for the fixing heater conventionally, and a thermistor is generally used as the temperature detector.

The surface temperature of the fixing heater will rise when power is supplied to said heater, and the temperature detector mounted either in the vicinity of or in contact with the fixing heater detects the surface temperature of the heater, and the temperature detection data of the heater is outputted from the fixing control circuit to the control circuit.

For example, a microcomputer is provided In the control circuit. Said microcomputer comprises an analog port, and when an analog voltage Is inputted from the thermistor to the analog port, the analog voltage value is converted to digital data, which will be taken Into the microcomputer in the control circuit.

The analog port has an analog voltage resolving power of approximately 256 level (equally divided into 255 parts) of the reference voltage in general.

Further, the fixing temperature Is set to a temperature enabling heat-fixing the toner on the paper, considering the feeding rate of the paper passing through the fixing device of the image forming device, or the toner material and the like. If the temperature of the fixing heater detected by the temperature detector is lower than said fixing temperature, the signal for providing electricity to the fixing heater will be outputted from the control circuit to the zero-cross circuit, and driving signal is outputted from said zero-cross circuit to the fixing heater, thereby providing electricity to the heater.

On the other hand, when the temperature of the heater being detected by the temperature detection circuit is higher than said fixing temperature, the signal for not providing power to the fixing heater will be outputted from the control circuit to the zero-cross circuit, and the fixing heater is turned off. Thereby, the fixing heater is controlled to maintain a predetermined fixing temperature.

Moreover, since the above temperature control method is controlled by the microcomputer in the control circuit, if the microcomputer becomes out of control by electric noise, disorder, temperature rise and the like, no fixing temperature control will be performed, or the heater lamp will be lighted continuously, generating smoke or fire.

Therefore, the prior art device is quipped with a high-temperature protect circuit comprising only hardware, other than the above-mentioned software process. The detailed explanation of said high-temperature protect circuit is omitted, since it is not directly related to the present invention.

Further, the structure of the conventional fixing device is explained in the following description. The fixing device comprises of a heater lamp, a thermistor, an upper heat roll (fixing roll), and a lower heat roll (pressurization roll).

The heater lamp is mounted in the interior of the rotatable upper heat roll, which is for heating the upper heat roll to a predetermined temperature as was explained above. A silicon rubber and the like are used as the material of the lower heat roll, and a metal pipe treated with TEFLON and the like is used for the upper heat roll.

The thermistor is mounted either in the vicinity of or in contact with the upper portion of the upper heat roll that detects either the surface or approximate temperature of the upper heat roll. According to the detection results, the heater lamp is either turned on or off, in order to control the upper heater roll to maintain an appropriate temperature.

On the other hand, as was disclosed above, the fixing device is positioned in front of a discharge opening in a conveyance passage passing through the image forming portion. There, the paper to where the toner image was transferred is conveyed through the upper heat roll and the lower heat roll, where the toner on the paper is melted by the heat of the upper heat roll, and pressurized between the upper heat roll and the lower heat roll. Thereby, the toner image on the sheet is turned into a permanently visible image.

A halogen lamp is widely used as the heating means for heating the fixing roll.

The outline of the circuit block, the structure, and the temperature control method of the fixing device in the prior art was as explained above. Further, the control method of the fixing temperature is disclosed in Japanese Laid-Open Patent Publication No. 55-89879, Japanese Laid-Open Utility Model Publication No. 1-171471, and Japanese Laid-Open Patent Publication No. 58-54365.

Japanese Laid-Open Patent Publication No. 55-89879 discloses an art for varying the power supply to the heater per period time by determining the temperature varying rate of the heater in the fixing device.

Instead of controlling the fixing temperature to a fixed value, the above publication discloses to vary the temperature control corresponding to the temperature change or heat taken by the paper, and to vary the power corresponding to the temperature varying rate at the initial power turn-on time, thereby reducing overshooting and the like.

Japanese Laid-Open Utility Model Publication No. 1-171471 discloses an art for preventing the deterioration of the fixing roll, wherein during the stand-by state of the image forming device, the fixing roll is driven when the fixing heater temperature is high, and the roll is not driven when the temperature is low.

Japanese Laid-Open Patent Publication No. 58-54365 discloses an art for preventing the temporary stop of the copying operation caused by the reduction of temperature, by temporarily stopping the copying operation when the fixing temperature is reduced during the operation, and reducing the speed of the number of sheets copied per unit time (number of sheets/minute)when continuous printing is restarted.

According to Japanese Laid-Open Patent Publication No. 55-89879, the fixing temperature is not controlled to a fixed temperature, but rather, the temperature varying rate of the heater in the fixing device is determined, and the power supply to the heater per unit time is changed. Further, the temperature control is changed based on the temperature change or heat taken by the sheet paper, and the power is varied similarly by the temperature varying rate at the initial power turn-on time.

Accordingly, the above method is effective in that an appropriate fixing temperature control and reduction of overshooting and the like is possible in a high-speed facsimile device and the like to which a band compression is applied, where the feeding rate of the record paper is not fixed.

Moreover, it is effective in that the initial overshooting and the like could be prevented in the copying machine or the printer whose feeding rate of the record paper is generally constant, when turning the power on after the power has been turned off for a long period of time.

However, according to the disclosure of Japanese Laid-Open Patent Publication No. 55-89879, the method is for controlling the supply of power based on the temperature varying rate among certain reference temperatures being measured. Therefore, in the continuous copying operation by copying machines and printers where the feeding rate (conveyance speed) of the paper is generally constant, which is in a comparatively stable region, the temperature difference between the reference temperature and the measured temperature is comparatively small, and the temperature varying rate is comparatively slow, there was a problem that accurate temperature measurement and temperature control was difficult.

Further, Japanese Laid-Open Utility Model Publication No. 1-171471 discloses driving the fixing roll when the fixing heater temperature is high, and not driving the fixing roll when the temperature is low, during the stand-by state. This is effective in that the deterioration of silicon rubber caused by adding pressure for a long period of time to the fixing roll could be prevented.

However, according to the contents of the Publication, the fixing roll and the heater are only controlled by a predetermined fixing temperature, and the fixing roll is driven for each time of the fixing temperature control. This caused problems such as unnecessary power consumption, and occurrence of noise.

Further, Japanese Laid-Open Patent Publication No. 58-54365 discloses stopping the copying operation when the fixing temperature is decreased while copying, and when continuous copying is restarted, the copying paper speed per unit time (number of sheets/minute) is decreased. This is effective in that copying operation could be continued without stopping the copying operation temporarily when the temperature is reduced.

However, according to the disclosure of the above Publication, instead of the necessity to temporarily stop the copying operation, the copying paper speed is decreased when the temperature is decreased. Therefore, it had problems such as the productivity being dropped compared to normal operation, and the time needed for the copying operation being longer. Accordingly, none of the above-mentioned prior art techniques realized a control method for minimizing the temperature ripple of the fixing device, and preventing reduction of productivity, even when the paper size or commercial power is changed, in the comparatively stable region such as during the continuous copying by the copying machine or printer having a generally fixed conveyance speed of the paper.

On the other hand, a zero-cross control and a phase control were generally known conventionally as the power control method of the heater applied in the temperature control of the fixing process.

The zero-cross control method is a method where the heater is turned on or off at the zero-cross point (zero point) of the AC waveform. This is not suitable for the temperature control of a thin heat roll since detailed power control is troublesome and temperature ripple is comparatively large, but it is advantageous in that occurrence of electric noise is comparatively small.

The phase control method is a control method where power is turned on only between a predetermined phase in the AC waveform. This is suitable for the temperature control of a thin heat roll since detailed power control is possible and temperature ripple is comparatively small, but the occurrence of electronic noise is larger compared to the zero-cross control method.

When the temperature ripple of the heat roll is large, a so-called hot offset may occur where the stain of toner adheres to the heat roll, or fixing disorder due to low temperature may happen.

The restriction against the electronic noise (noise terminal voltage) flowing from the electronic devices to the commercial power source is getting strict year after year. Further, from the energy-saving point of view, in the attempt to shorten the time needed to achieve the printable (image forming) status from the power switch-on time, which is so-called a warm-up time, the thickness of the heat roll in the fixing device is getting thinner year after year.

However, though there is a need to raise the power of the heater in order to shorten the warm-up time, said electronic noise will also be increased when the heater power is increased. Another problem was that temperature ripple was also likely to increase when the heat roll thickness was decreased.

DEFINITIONS

TEFLON is a trademark owned by E. I. DU PONT DE NEMOURS AND COMPANY and is particularly used in connection with fluorine containing polymers in resin and dispersion form use in as additives in inks, plastics, lubricants, coatings and other host materials where attributes such as lubricity, friction reduction, nonstick and chemical and temperature resistance are desired and mores specifically to polytetrafluoroethylene.

SUMMARY OF THE INVENTION

The object of the present invention, therefore, is to provide an image forming device performing a best and stable temperature control by low electric power to a thin heat roll, where the occurrence of electronic noise is small, and the ripple of the fixing temperature is restrained, while productivity is maintained.

Further object of the present invention is to achieve the above-mentioned object and simultaneously provide an image forming device performing a best and stable temperature control irrespective to the size or kind of paper, or the commercial power source.

Further object of the present invention is to achieve the above-mentioned objects and simultaneously provide an image forming device performing a highly reliable temperature control even when the temperature detection means is out of order, or appropriate control is impossible.

In order to achieve the above-mentioned objects;

(1) A fixing device according to the present invention comprises a rotatable fixing roll arranged on a paper discharge side of a photosensitive body, a heating means for heating said fixing roll, a temperature detection means for detecting the surface temperature of said fixing roll, and a temperature control means for controlling the fixing roll surface to maintain a predetermined temperature by supplying a predetermined electric power to said heating means based on a detection signal from said temperature detection means, wherein the temperature of said fixing roll during continuous image forming is detected by said temperature detection means, and said temperature control means controls the electric power quantity supplied to said heating means by increasing or decreasing a half-wave unit cycle number of a commercial power source in order to reduce the temperature difference between a predetermined reference temperature and said detected temperature.

According to the above-mentioned fixing device, it is possible to provide a fixing device performing the best temperature control with respect to a thin heat roll with only small occurrence of electronic noise.

(2) Another fixing device of the present invention is a fixing device set forth in the paragraph (1), wherein said temperature control means sets a reference electric power quantity to be supplied to the heating means based on each paper size, and the electric power quantity at the time to start the image forming is selected from said reference electric power quantity based on the detected paper size.

There was fear in the conventional fixing control method that overshooting or undershooting may occur by the different paper sizes, since the necessary electric power quantity of the fixing heater differed for each paper size. With the above-mentioned construction of the fixing device, a stable temperature control was made possible with reduced overshooting or undershooting happening at the start of the copying operation.

(3) Another fixing device of the present invention is a fixing device set forth in the paragraph (1) or (2), wherein said temperature detection means detects the fixing roll temperature during continuous image forming for each image forming operation, and said temperature control means supplies electric power to the heating means during the time from the feeding of paper to the turning on of a copy lamp.

The conventional device had a problem in that when the fixing heater lamp was turned on while the copy lamp was on, the voltage was temporarily reduced by the rush current to the heater lamp, thereby reducing the image quality of the copy. With the above-mentioned construction of the fixing device, however, the image quality is stabilized with no reduction of the voltage supplied to the copy lamp, since the detection cycle set forth in the paragraph (1) or (2) is set to every sheet being copied, and the timing to start turning the heater lamp on is determined.

(4) Another fixing device of the present invention is a fixing device set forth in the paragraph (1) or (2), wherein said temperature control means stops the supply of electric power to said heating means when the half-wave cycle number of the commercial power source supplied to the heating means either exceeds a predetermined upper limit value or falls below a predetermined lower limit value within the cycle.

According to the above-mentioned fixing device, the occurrence of fire or smoke caused by an abnormal overheating of the heater, or fixing disorder caused by the decrease of fixing temperature could be prevented, thereby improving the reliability greatly, and stabilizing the image quality.

(5) Another fixing device of the present invention is a fixing device set forth in the paragraph (4), wherein the temperature control means switches the upper limit value or the lower limit value according to each paper size.

According to the above-mentioned fixing device, the reduction in accuracy to sense disorder caused by the difference in electric power necessary for each paper size could be prevented, thereby improving the reliability even further, and enabling to maintain the image quality.

(6) Another fixing device of the present invention is a fixing device set forth in the paragraph (1) or (2), wherein the temperature control means corrects the reference electric power quantity at the time to start the image forming based on the detected commercial power source.

Since commercial power source voltage differs according to each country or region, there was a need to set the reference electric power set forth in the paragraph (1) or (2) individually according to each commercial power source, which caused the increase in cost due to reduced productivity by the increase in product variety and selling stock. According to the fixing device set forth in the paragraph (6), the automatic setting enables to omit the individual setting of the reference electric power, and the unification of product variety. This enables to lower the cost by the increase in productivity and decrease in selling stock.

(7) Another fixing device of the present invention comprises a rotatable fixing roll arranged on a paper discharge side of a photosensitive body, a heating means for heating said fixing roll, a temperature detection means for detecting the surface temperature of said fixing roll, and a temperature control means for controlling the fixing roll surface to maintain a predetermined temperature by supplying a predetermined power to said heating means based on a detection signal from said temperature detection means, wherein said temperature control means comprises a first temperature control means operating during image forming, and a second temperature control means operating during standby, said first temperature control means and said second temperature control means detecting said fixing roll temperature by said temperature detection means, controlling the electric power quantity supplied to said heating means by increasing or decreasing a half-wave unit cycle number of a commercial power source in order to reduce the temperature difference between a predetermined reference temperature and said detected temperature, and said second temperature control means further controlling the power supply to said heating means having a predetermined hysteresis width with respect to said reference temperature.

Since no paper would be conveyed after the copying operation is finished, there is a possibility in the fixing device set forth in the paragraph (1) or (2) to generate an overshooting by the reference electric power quantity set during the copying operation becoming too large. The fixing device set forth in the paragraph (7) prevents such overshooting from occurring, which is effective in preventing hot offset and fixing disorder.

(8) Another fixing device of the present invention is a fixing device set forth in the paragraph (7), wherein the temperature control means is switched from said second temperature control means to said first temperature control means when the temperature reaches a second reference temperature lower than the reference temperature based on the detection signal from the temperature detection means, in the case that the image forming is performed continuously from the initial rising of the heating means at switching-on of the power.

In cases where the copying operation is continuously performed after the power switch-on of the device, the warm-up time of the fixing device in a cooled state was long when using the electric power quantity set according to each paper size. According to the above-mentioned fixing device, the warm-up time in such case could be minimized, thereby improving productivity.

(9) Another fixing device of the present invention is a fixing device set forth in the paragraph (8), wherein the second set temperature is corrected based on the detected power source voltage.

According to the above-mentioned invention, problems of overshooting being caused by the change in rising curvature during warm-up, or increase in warm-up time according to the power source voltage could be prevented, thereby improving productivity.

(10) Another fixing device of the present invention is a fixing device set forth in the paragraph (1) or (7), wherein in the control for switching the reference temperature in corresponding to the image forming number of sheets from the start of the image forming operation, the difference in electric power quantity supplied to the heater at each of the reference temperature, is to be stored said difference in electric power quantity being subtracted from the presently supplied power when switching said reference temperature.

When the fixing device is in a cooled state when switching on the power, the control temperature is set in a higher value intentionally during the first few sheets in the start of the copying operation, so that the temperature approaches the proper temperature by each copying operation. This caused the occurrence of overshooting or undershooting when switching the control temperature according to the power source voltage or the paper size. According to the above-mentioned image fixing device, such overshooting or undershooting could be prevented, thereby preventing hot offset or fixing disorder.

(11) Another fixing device of the present invention is a fixing device set forth in the paragraph (1), wherein the electric power supply at the final copying operation for each of the copying paper is to be stored, and said electric power supply value is utilized as the reference electric power at the start of the next copying operation.

Generally, even in the paper of the same size, the thickness or weight of each paper differ between the variety of paper, which means that the electric power necessary differs between the different kinds of paper. However, the kind of paper used in the same device could be presumed as roughly the same kind.

According to the above-mentioned fixing device, once the most suitable value is obtained by the continuous copying operation, the value is used for the next copying mode, thereby reducing the time needed to converge to the reference temperature, and improving productivity.

BRIEF DESCRIPTION OF THE DRAWINGS

FIG. 6 is a drawing showing the relation between the fixed temperature and time according to one embodiment of the image forming device of the present invention;

FIG. 7 is a control flowchart according to one embodiment of the image forming device of the present invention;

PREFERRED EMBODIMENT OF THE INVENTION

Figure 1:
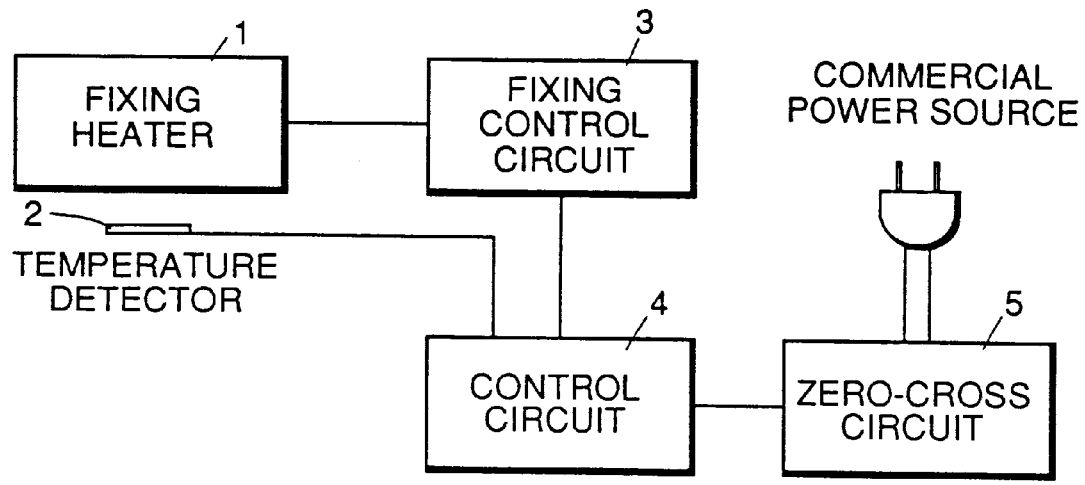
FIG. 1 is a diagram showing the outline of the related circuit block of the prior art.

With respect to FIG. 1, the outline of the conventional control block for the fixing device is to be explained, which comprises a fixing heater 1, a temperature detector 2, a fixing control circuit 3, a control circuit 4, a zero-cross circuit 5 and the like.

An AC (alternating current) driven halogen lamp and the like are widely used for the fixing heater conventionally, and a thermistor is generally used as the temperature detector.

In FIG. 1, the surface temperature of the fixing heater 1 will rise when power is supplied to said heater 1, and the temperature detector 2 mounted either in the vicinity of or in contact with the fixing heater detects the surface temperature of the heater 1, and the temperature detection data of the heater 1 is outputted from the fixing control circuit 3 to the control circuit 4.

For example, a microcomputer not shown in the drawing is provided in the control circuit 4. Said microcomputer comprises an analog port, and when an analog voltage is inputted from the thermistor to the analog port, the analog voltage value is converted to digital data, which will be taken into the microcomputer in the control circuit 4.

The analog port has an analog voltage resolving power of approximately 256 level (equally divided into 255 parts) of the reference voltage in general.

Further, the fixing temperature is set to a temperature enabling heat-fixing the toner on the paper, considering the feeding rate of the paper passing through the fixing device of the image forming device, or the toner material and the like. If the temperature of the fixing heater 1 detected by the temperature detector 2 is lower than said fixing temperature, the signal for providing electricity to the fixing heater 1 will be outputted from the control circuit 4 to the zero-cross circuit 5, and driving signal is outputted from said zero-cross circuit 5 to the fixing heater 1, thereby providing electricity to the heater 1.

On the other hand, when the temperature of the heater 1 being detected by the temperature detection circuit 2 is higher than said fixing temperature, the signal for not providing power to the fixing heater 1 will be outputted from the control circuit 4 to the zero-cross circuit 5, and the fixing heater is turned off. Thereby, the fixing heater 1 is controlled to maintain a predetermined fixing temperature.

Moreover, since the above temperature control method is controlled by the microcomputer in the control circuit 4, if the microcomputer becomes out of control by electric noise, disorder, temperature rise and the like, no fixing temperature control will be performed, or the heater lamp 1 will be lighted continuously, generating smoke or fire.

Therefore, the prior art device is quipped with a high-temperature protect circuit comprising only hardware, other than the above-mentioned software process. The detailed explanation of said high-temperature protect circuit is omitted, since it is not directly related to the present invention.

Figure 2:
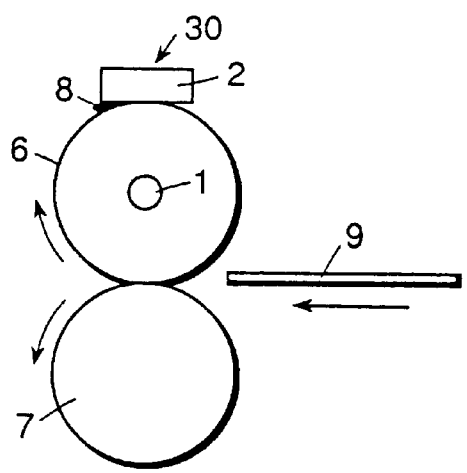
FIG. 2 is a cross-sectional side view of the fixing device of the prior art.

Further, the structure of the conventional fixing device is explained in the following description. As shown in FIG. 2, the fixing device 30 comprises of a heater lamp 1, a thermistor 2, an upper heat roll 6 (fixing roll), and a lower heat roll 7 (pressurization roll).

The heater lamp 1 is mounted in the interior of the rotatable upper heat roll 6, which is for heating the upper heat roll 6 to a predetermined temperature as was explained above. A silicon rubber and the like are used as the material of the lower heat roll 7, and a metal pipe treated with Teflon and the like is used for the upper heat roll 6.

The thermistor 2 is mounted either in the vicinity of or in contact with the upper portion of the upper heat roll 6 that detects either the surface or approximate temperature of the upper heat roll 6. According to the detection results, the heater lamp 1 is either turned on or off, in order to control the upper heater roll 6 to maintain an appropriate temperature.

On the other hand, as was disclosed above, the fixing device 30 is positioned in front of a discharge opening in a conveyance passage passing through the image forming portion. There, the paper 9 to where the toner image was transferred is conveyed through the upper heat roll 6 and the lower heat roll 7, where the toner on the paper 9 is melted by the heat of the upper heat roll, and pressurized between the upper heat roll 6 and the lower heat roll 7. Thereby, the toner image on the sheet is turned into a permanently visible image.

A halogen lamp is widely used as the heating means for heating the fixing roll. One example of the circuit for switching on the heater lamp 1 is shown in FIG. 3.

When a signal PR2 from the control circuit 4 turns to L (low-level), the power relay PR-2 is turned on, and AC voltage is applied to the present circuit. In this state, if the microcomputer decides that the fixing portion temperature is lower than the regulated temperature, a light-emitting diode installed inside a photo triac coupler PTD401 is turned on, and the circuit between 4 pin and 6 pin will be in the shorted state from the following zero cross point of a sine wave of the AC voltage.

Then, AC voltage is applied to the both ends of R405, and a gate current IG flows in the direction of the arrow. Then, the connection between triac T1 and T2 for the heater lamp 1 is shorted, and a load current IL flows to the heater lamp 1 in the direction of the arrow.

Figure 3:
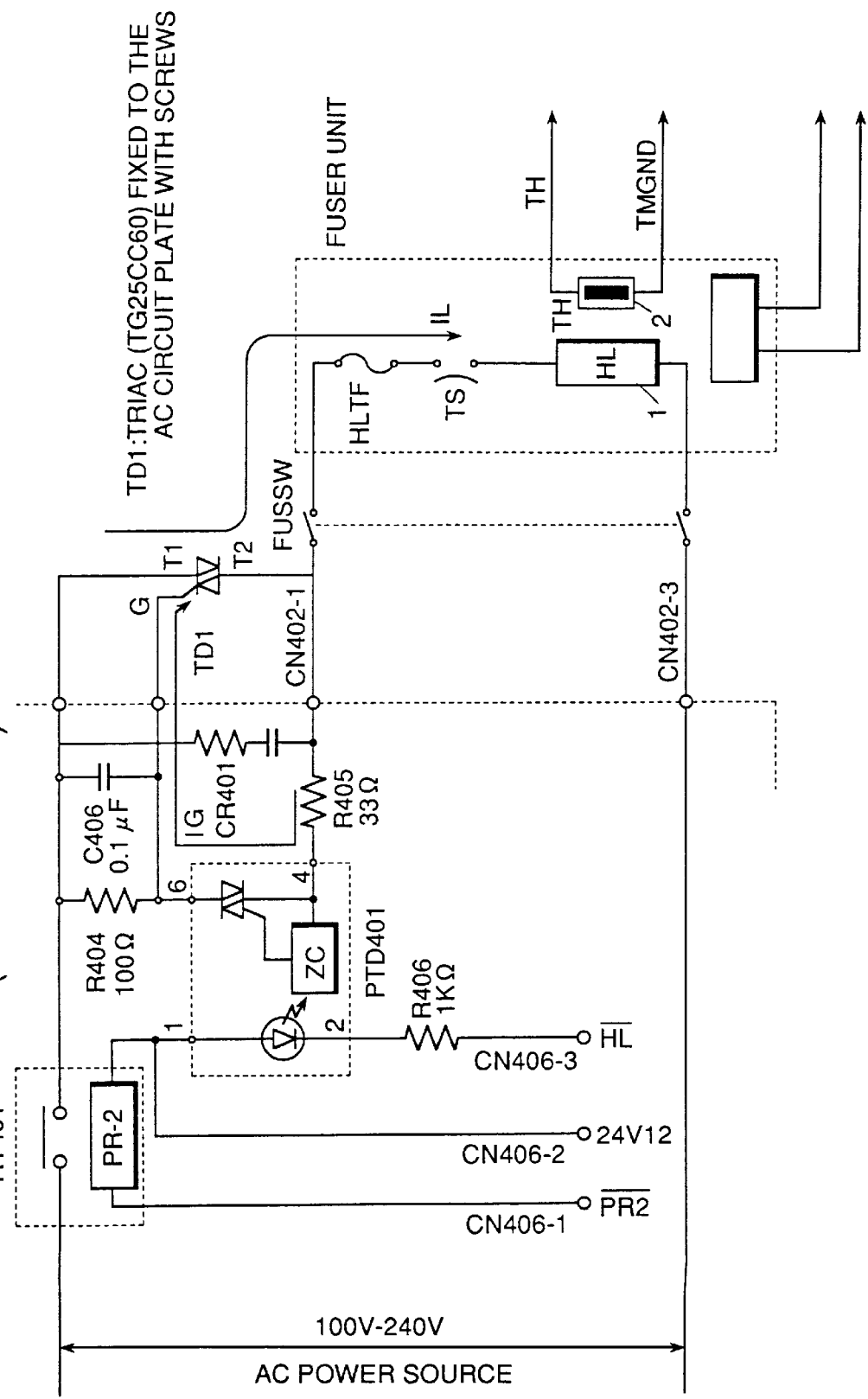
FIG. 3 is a circuit diagram showing the heater lamp switch-on circuit of the prior art.

The following is a listing of the reference signs shown on FIG. 3 with a brief explanation therefore.

CN406-1 First pin of connector 406

CN406-2 Second pin of connector 406

CN406-3 Third pin of connector 406

PR2 Signal to turn a power relay on or off

24V12 12th 24V power supply, the device includes equal to or more than 12 24V power supplies HL Signal to turn a heater lamp on or off RY401 Contact of power relay R406 Resistor R404 Resistor C406 Capacitor TMGND Ground for thermsistor (TH)

ZC Photodetector of photo-coupler (PDT401)

CR401 Capacitor and Resistor connected together in series

TR1 TRIAC (Triode AC switch)

G Gate of TRIAC

CN402-1 Signal line to conduct electric current between T2 and G

CN402-3 Power input line for AC

FUSSW Switch being on when a fixing unit is included in the main apparatus

HLTF Thermal fuse

TS Thermostat.

The following is a detailed description on each embodiment in the case where the fixing device according to the present invention is applied to a copying machine to which an electrophotograph method is to be applied.

The present embodiment only describes the case where the device is applied to a copying machine, but it is clear that the present invention could not only be applied to copying machines, but also to facsimile devices and laser printers using the electrophotograph method and also using heat-fixing method.

Moreover, only the embodiment using a heater lamp comprising a halogen lamp as the fixing heater is described, but it is apparent that other heat sources, such as an AC driven heat source, could be applied to the present invention.

EMBODIMENT 1

FIG. 1 shows a block diagram showing the temperature control circuit according to the fixing device of copying machines and printers.

By monitoring the alternating current commercial power source of 60 Hz or 50 Hz being connected to the image forming device by a zero-cross circuit 5, a fixing heater 1 could be turned on or off by alternating current half-wave units synchronizing to the alternating current of the commercial power source.

That is, by detecting the temperature of the fixing heater 1 by a temperature detector 2, and comparing the detected value to either or both an upper limit value $t_1$ or a lower limit value $t_2$ with respect to a reference temperature to by a control circuit 4, controlling the increase or decrease of the present supply of electric power ("n" alternating current half-waves in FIG. 4) for each of a reference cycle T is enabled, and the electric power to be supplied to the fixing heater 1 is calculated.

Therefore, by outputting a drive control signal of the fixing heater 1 to a fixing control circuit 3 according to said calculated value, the fixing temperature could be set to an appropriate value.

Figure 5:
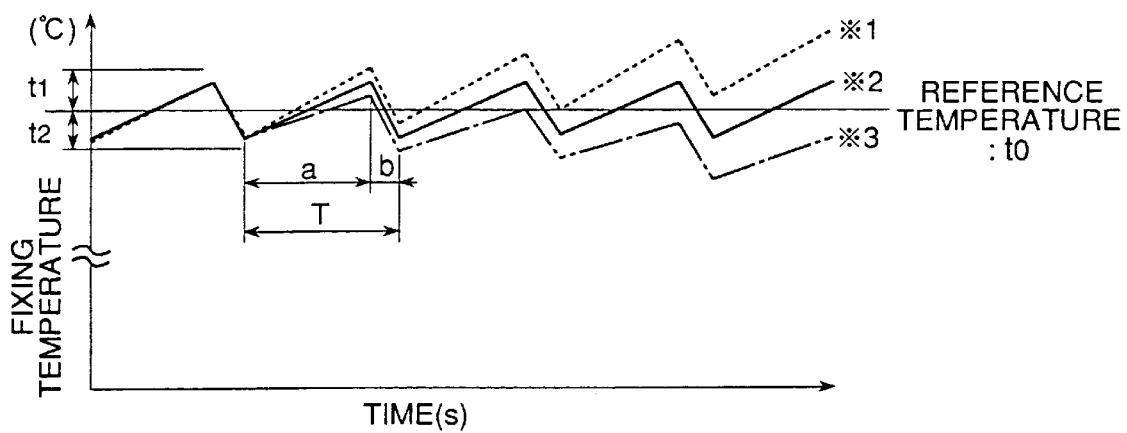
FIG. 5 is a drawing showing the relation between the fixing temperature and time according to one embodiment of the image forming device of the present invention.

If the electric power quantity supplied to the fixing heater by each reference cycle T during copying operation is appropriate (when the heat quantity taken by the paper and the electric power quantity being supplied is equal), the fixing temperature moves up and down very regularly between a higher and a lower value (between $t_1$ and $t_2$) of the reference temperature as shown in ⋅✗⋅2 of FIG. 5. However, if the electric power supply is excessive, the fixing temperature gradually rises as shown in ⋅✗⋅1 of FIG. 5, and if supply is insufficient, the fixing temperature gradually decreases as shown in ⋅✗⋅3.

In the present invention, the difference between the detected temperature and the reference temperature is compared per every reference cycle T, and by controlling the increase or decrease of power quantity supply, an appropriate fixing temperature status could be obtained continuously as shown in ⋅✗⋅2 of FIG. 5.

This portion will be explained in detail by the following description with reference to FIG. 4. During a cycle in the copying operation, the power supplied to the fixing device 30 is in proportion to an electrifying interval a to the heater. That is, the number n of alternating current half-waves being applied to the fixing heater 1 during the electrifying interval a (the dotted area in the drawing) is equivalent to the power quantity.

When the minimal value of the fixing temperature $t_{min}$ detected in the interval of the reference cycle T is below the lower limit value $t_2$ of the reference voltage, the number of alternating current half-waves corresponding to the difference thereof, $\Delta A = t_2 - t_{min}$, is added to a number n of the alternating current half-waves being supplied.

In the example, one alternating current half-wave is added in the next interval, and when the electrifying interval a is increased interval by $T_1$ as a result, interval b for electrifying the fixing heater will be reduced since T is fixed (T=a+b). Therefore, the minimal value of the fixing temperature $t_{min}$ is raised of its temperature by $\Delta t(t'_{min})$, thereby exceeding the lower limit value $t_2$. The explanation utilizing the flowchart will be performed in the description of embodiment 3.

In the present embodiment, the fixing temperature detection is performed per a fixed cycle. However, the present invention is not limited thereto, but instead, the electric power could be calculated by performing temperature detection by a half-wave unit or by a random interval, and then said power could be applied to the heater 1.

Moreover, since the number of alternating current half-waves is a natural number, the power quantity varying in steps could be obtained by changing the number of alternating current half-waves. For example, when the difference between two heater temperatures $t_1°$ C. and $t_2°$ C. being detected is small, the power being applied, in other words, the number of alternating current half-waves, may be the same number n. In such case, the number of alternating current half-waves should only be increased or decreased when the power to be changed exceeds the power corresponding to one half-wave.

EMBODIMENT 2

The amount of electric power to be applied to the fixing heater 1 in order to control the roll to the predetermined fixing temperature differs according to the paper size. Therefore, when setting the number n of the alternating current half-waves at the start of the copying operation to be the same value for all paper sizes, overshooting (⋅✗⋅5) or undershooting (⋅✗⋅6) as shown in FIG. 6 may occur at the time of initial copy (especially for the first sheet).

Therefore, by setting the number n of the alternating current half-waves for each of the paper size being detected at the time of the copying operation, the copying operation could be started by a more appropriate electric power, and the fixing temperature could be converged to the reference temperature swiftly, as shown in ⋅✗⋅4.

Figure 8:
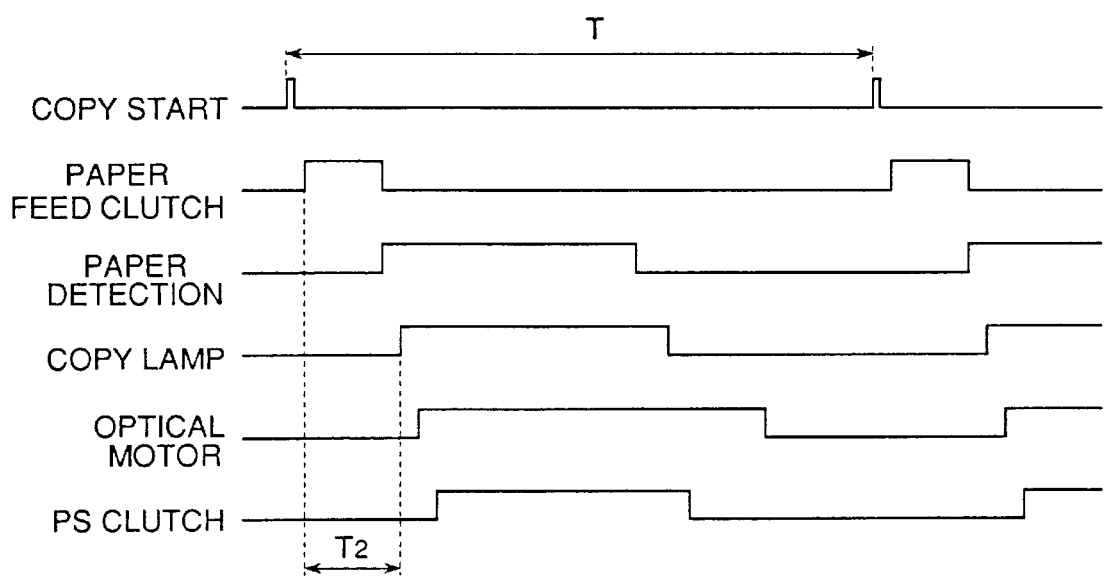
FIG. 8 is a time chart showing the relation between each control signal according to one embodiment of the image forming device of the present invention.

These operations are explained in FIG. 7. The copying operation starts at Step 0, and then the paper size being set is detected (Step 1). As the detection method, a method for detecting the size by the sensor or switch mounted on each paper cassette, or a method for measuring the paper length being conveyed by the time the paper detection is on, as shown in FIG. 8, could be applied. This is not an essential point directly related to the present invention, so the detailed description thereof is eliminated.

Next, the determination on whether the detected paper size is A3 size or not is performed (Step 2). If the paper size is A3, then procedure is advanced to Step 3, where the electric power quantity is set to a reference electric power quantity $E_1$ which corresponds to the paper of A3 size. If the paper size is not A3 size, then procedure is advanced to Step 4, where determination on whether the paper size is B4 size or not is performed.

If the paper size is detected to be B4 size in Step 4, the procedure is advanced to Step 5, where the electric power quantity is set to a reference electric power quantity $E_2$ which corresponds to the paper of B4 size. If the paper size is not B4 size, then procedure is advanced step by step to the next steps for determining the paper size. Finally, the paper size is determined whether it is a postcard size or not (Step 6).

When the paper size is determined to be a postcard size in Step 6, then procedure is advanced to Step 7 where the electric power quantity is set to $E_N$ which corresponds to the paper of a postcard size. If the paper does not have a postcard size, then the procedure is advanced to Step 8, where the electric power quantity is set to a reference electric power quantity $E_{N+1}$ which is either the same as the power for the postcard size paper or somewhat smaller.

By performing the above-mentioned operation, the electric power quantity is set to a reference electric power quantity of $E_1, E_2, \ldots, E_N, E_{N+1}$ which corresponds to papers sizes of A3, A4, ..., postcard, and others. Thereby, the overshooting or undershooting occurring at the initial time of the copying operation caused by the different paper sizes could be prevented, enabling a stable fixing temperature control.

EMBODIMENT 3

Figure 9:
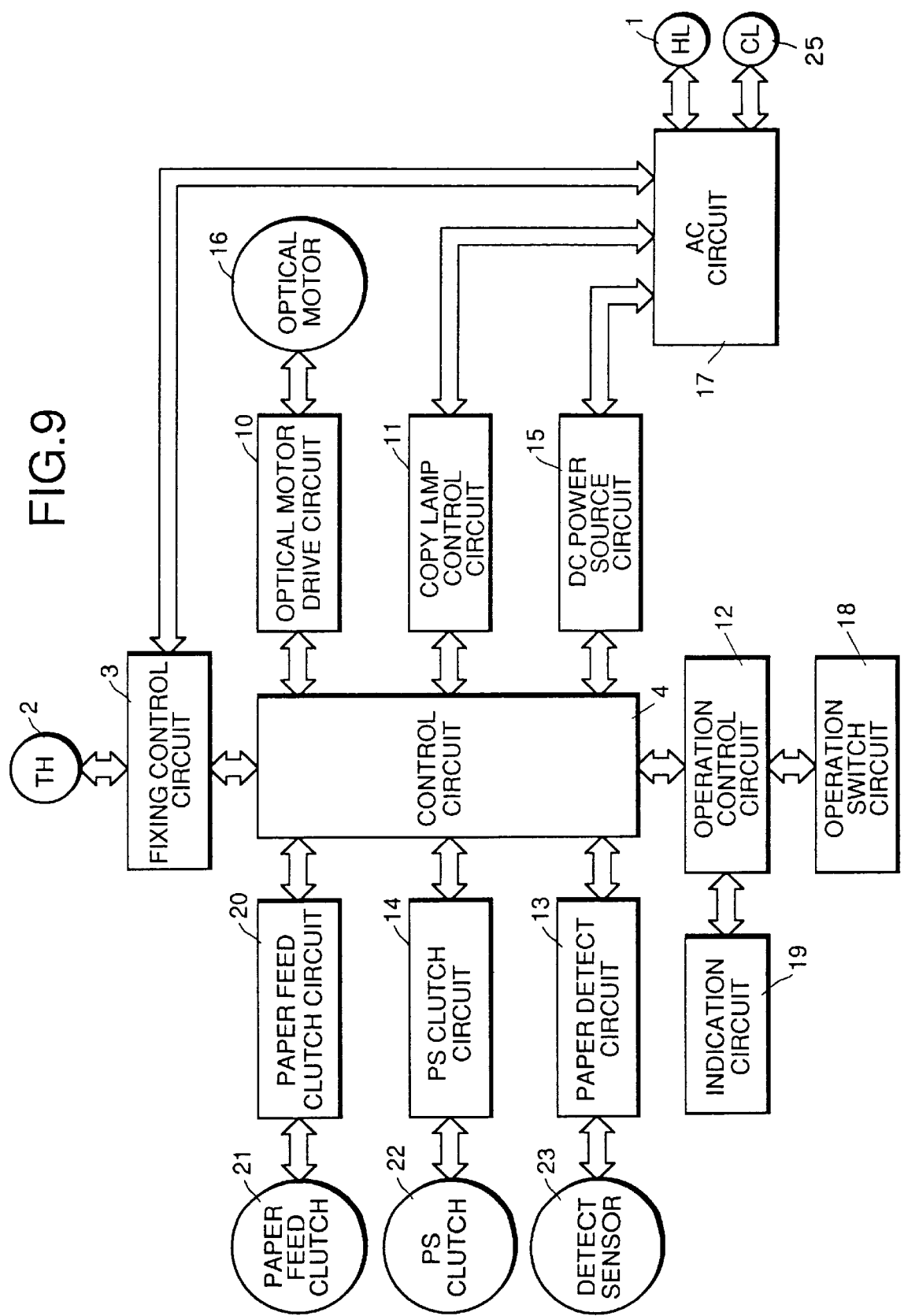
FIG. 9 is a circuit block diagram according to one embodiment of the image forming device of the present invention.

FIG. 8 is a timing chart showing the outline of the copying operation according to the present embodiment, and FIG. 9 is a block diagram showing the outline of the related circuit connection.

In FIG. 9, a control circuit 4 plays a role to control the whole device, where a fixing control circuit 3, an optical motor driving circuit 10, a copy lamp control circuit 11, a DC power circuit 15, an operation control circuit 12, a paper detection circuit 13 where a paper detection sensor 23 is connected, a PS clutch circuit 14 where a PS clutch 22 is connected, and a paper feed clutch 21 circuit 20 where a paper feed clutch is connected are connected.

Further, the optical motor driving circuit 10 is provided for DC controlling an optical motor 16 for scanning the document by a optical carriage not shown, guiding an optical image onto the photosensitive body, and generating a pre-determined electrostatic latent image onto said photosensitive body not shown, where an optical motor 16 is connected.

On the copy lamp control circuit 11 is connected a copy lamp 25 for lighting a document, by way of an AC circuit 17, where control of a lighting quantity based on the density of the document or user set-up, or a compulsory switch-off by hardware in the case of CPU disorder is performed correspondingly to a lighting on/off signal and the like from the copy lamp 25 of the control circuit.

Further, an operating switch circuit 18 comprising of operating switches, and an indication circuit 19 comprising of liquid crystal or light emitting diode and the like are connected to the operation control circuit 12, where the key operation by the operator is outputted to the control circuit 4, or a predetermined display is performed based on the display signal from the control circuit 4.

Next, a fixing control circuit 3 is connected to the control circuit 4. The surface temperature of the upper heat roll 6 detected by the thermistor 2 is inputted to an analog port of the microcomputer in the control circuit 4, and according to said detected temperature, the power control of the heater lamp (fixing heater) 1 connected by way of the AC circuit 17 is performed.

Next, the lighting-on timing of the copy lamp 25 and the heater lamp 1 is explained below with reference to FIG. 8.

First, in correspondence to the number of sheets to be copied, a copy start signal is obtained by an inner timer and the like of the microcomputer in the control circuit 4. For example, in the copying machine having a copying speed of 10 sheets/minute, the time needed to copy one sheet (the cycle time) T is 6 seconds, and therefore, the copy start signal is outputted every six seconds.

In response to said copy start signal, the paper feed clutch signal is turned on, and therefore, the paper feed clutch 21 is driven. When a sheet of paper 9 is conveyed from a paper cassette not shown, the paper detection sensor 23 outputs a paper detect signal. Next, a copy lamp lighting-on signal for turning on the copy lamp 25 is turned on, and at the same time, an optical motor driving signal for supplying power to the optical motor 16 is turned on.

Next, the exposure of the document to be copied is started by a scanning unit mounting a reflecting mirror not shown and a copy lamp 25, and in correspondence to the conveyance timing of the image, the PS clutch 22 is turned on, and the synchronization of the paper end portion and the end portion of the image forming position on the photosensitive body is performed.

Therefore, by application of the above control method, since voltage is started to be applied to the fixing heater 1 at the interval $T_2$ of FIG. 8, no electricity will be provided to the fixing heater 1 during exposure or while providing electricity to the copy lamp 25, and the voltage applied to the copy lamp 25 will not be reduced by rush electricity and the like. This is effective in providing a stable copy image quality.

Further, by supplying electric power to the fixing heater 1, and setting a cycle T for calculating the necessary quantity of electric power as said cycle time (6 seconds), the synchronization between the section of the electric power application timing $T_2$ to the fixing heater 1 could easily be performed, and further, setting the cycle time and the calculating cycle T to the same value effectively improves the calculation accuracy of the supply of electric power, since the taken heat quantity is ruled by paper.

Figure 4:
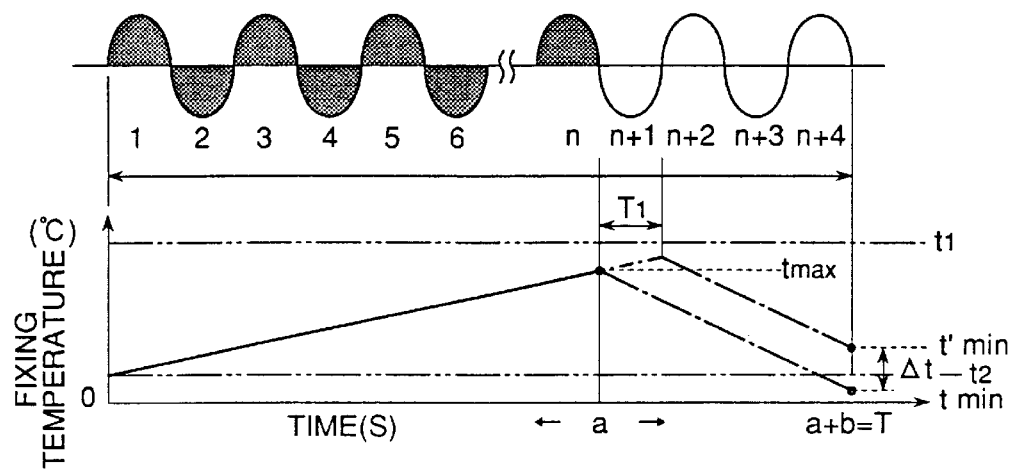
FIG. 4 is a diagram showing the relation between the alternating current half-waves, the fixing temperature, and time according to one embodiment of the image forming device of the present invention.
Figure 10:
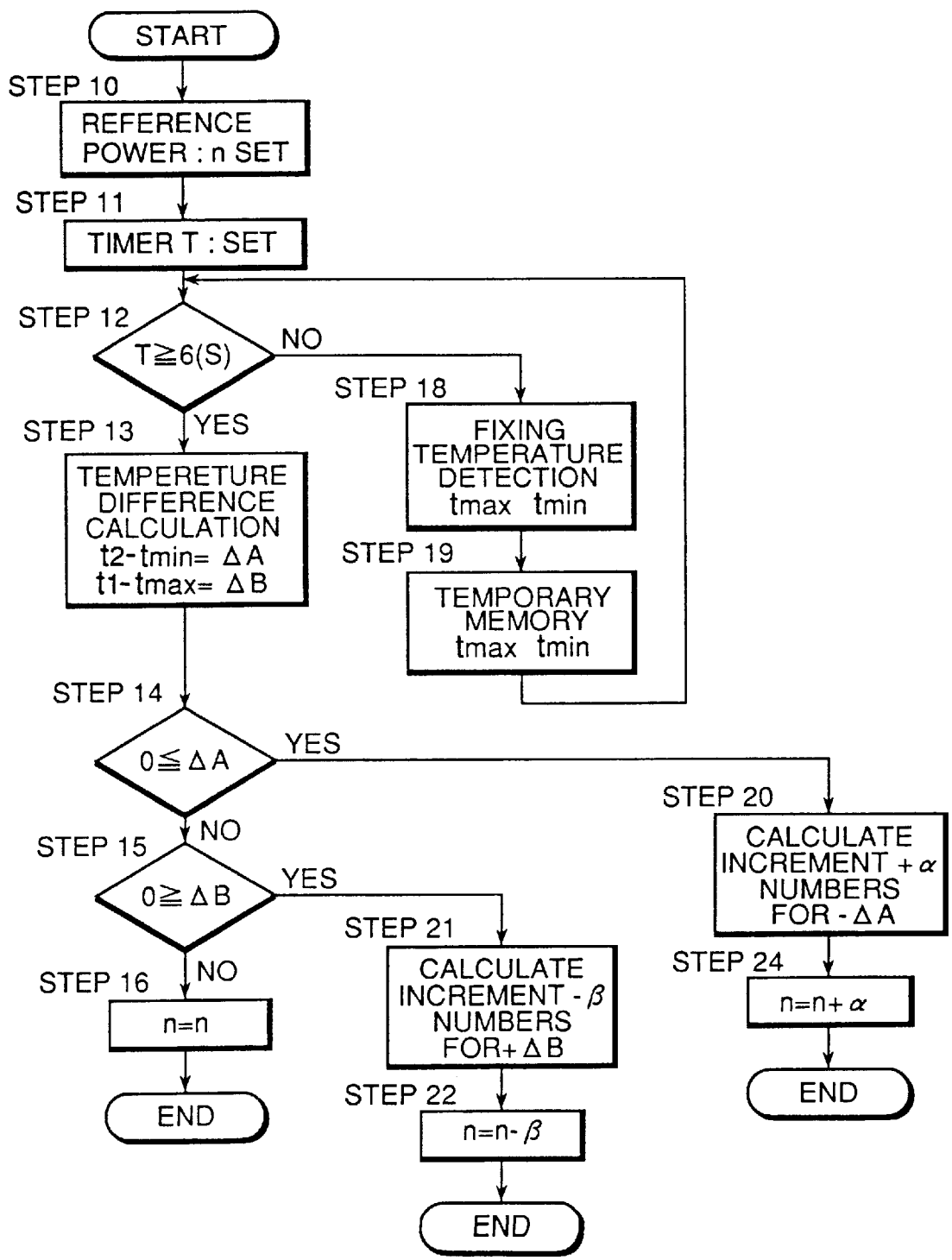
FIG. 10 is a control flowchart according to one embodiment of the image forming device of the present invention.

Next, the flowchart of FIG. 10 is used to explain FIG. 4.

When entering the copy mode, the reference electric power (n numbers of alternating current half-waves shown by the hatching of FIG. 4) is set at Step 10. Next, in Step 11, the cycle T (timer value) for measuring/calculating the electric power is set. In the present embodiment, the cycle T is set to 6 seconds.

Next, in Step 12, determination on whether the count value of the timer exceeded cycle T (6 seconds) or not is performed, and the fixing temperature is detected until the timer value exceeds 6 seconds (Step 18), and the maximum value and the minimum value of the detected temperature value is stored temporarily (Step 19).

If the count value of the timer exceeds 6 seconds, the difference between the maximum value/minimum value of the detected temperature during the cycle and the upper limit value/lower limit value of the reference temperature is calculated (step 13).

Next, it is determined in Step 14 whether the difference ΔA between the minimum value and the lower limit value is more than zero. If it is more than zero, or in other words, if the minimum value during said cycle is smaller than the lower limit value of the reference temperature, then procedure is advanced to Step 20, where the number a of half-waves to be increased in correspondence to the difference ΔA between the minimum value is calculated. Then, in Step 24, a numbers of half-waves are added to the half-wave n being set at that time.

On the other hand, if the difference ΔA between the minimum value is less than zero, or in other words, if the minimum value during said cycle is larger than the lower limit value of the reference temperature, procedure is advanced to Step 15, where determination on whether or not the difference ΔB between the maximum value and the upper limit value is zero or less. If it is zero or less, procedure is advanced to Step 21, where the number β of half-waves to be reduced in correspondence to the difference ΔB between the maximum value is calculated. Then, in Step 22, β numbers of half-waves are reduced from the half-wave n being set at that time.

When the difference ΔB between the maximum value and the upper limit value exceeds zero in Step 15, then it is decided that no overshooting is generated, and the present number n of half-waves is maintained (step 16).

EMBODIMENT 4

When performing a continuous copying operation, an unnecessary object 8 such as paper powder and toner are accumulated to the area between the upper heat roll 6 and the thermistor 2 (temperature detector) as shown in FIG. 2. When the amount of this unnecessary object 8 exceeds a permissible range, the thermistor 2 will be raised away from the upper heat roll 6, and there may be cases where the detected temperature is lower than the actual temperature.

A thermistor and the like are used generally as the temperature detector. However, the present invention is not limited to use of thermistor, but any kind of temperature detector could be used. Therefore, the detailed description of the thermistor is omitted.

Figure 11:
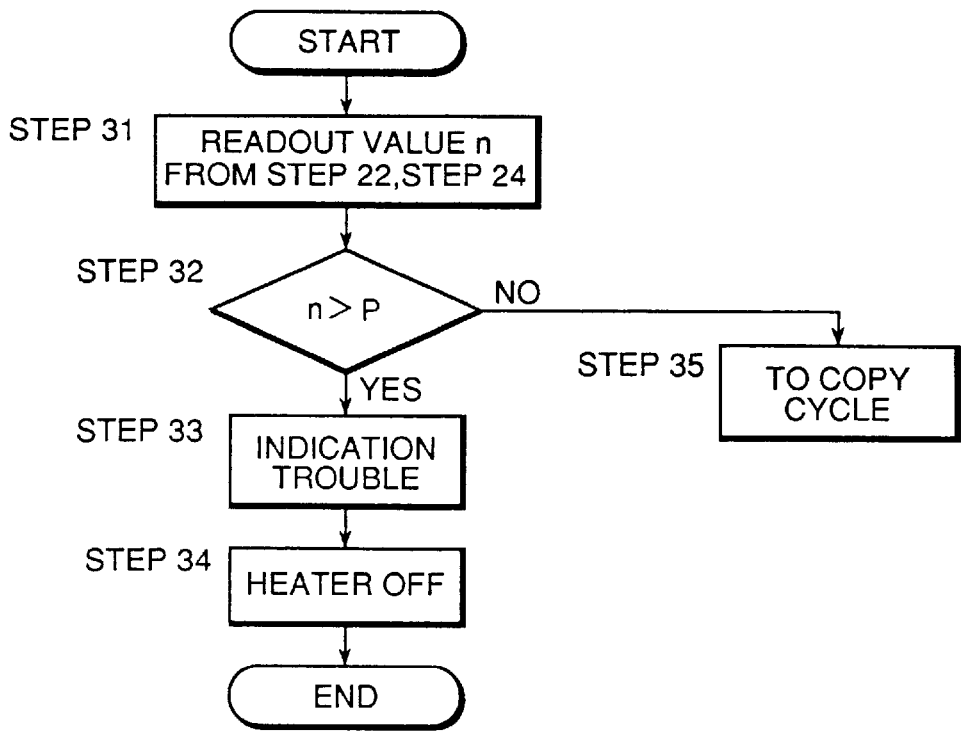
FIG. 11 is a control flowchart according to one embodiment of the image forming device of the present invention.

When setting the electric power quantity by the method disclosed in embodiment 3, the power quantity to be applied to the heater lamp 1, or in other words, the number of alternating current half-waves will increase in order, and on the other hand, the actual temperature of the upper heat roll 6 will exceed greatly beyond the reference temperature. This may provide damages to the members inside the device, and may bring about hot offset and in the worst case, generate smoke and fire. The present invention aims at preventing such state from occurring, which is explained hereinafter with reference to the flowchart of FIG. 11.

In Step 31, the electric power quantity n calculated at Step 22 and Step 24 of FIG. 10 is read out. In Step 32, determination is made on whether or not said value n does not exceed a maximum value P of the electric power quantity. If it does not exceed the value P, procedure is advanced to the copy cycle (Step 35), and if it exceeds the value P, trouble display is performed in Step 33, and the heater lamp 1 is turned off in Step 34.

Accordingly, by monitoring the calculation results of the alternating current half-wave n of FIG. 10 continuously, determination of trouble could be made before the temperature actually rises. Therefore, the device would not be damaged, and hot-offset or generation of smoke and fire could be prevented.

EMBODIMENT 5

When the resistance value of the thermistor 2 is decreased by condensation or deterioration, the detected temperature may be higher than the actual temperature of the upper heat roll 6. Accordingly, the electric power quantity applied to the heater lamp 1 (the number of alternating current half-waves) gradually decreases, and the temperature of the heat roll 6 may fall greatly below the reference temperature, resulting in occurrence of fixing disorder.

Figure 12:
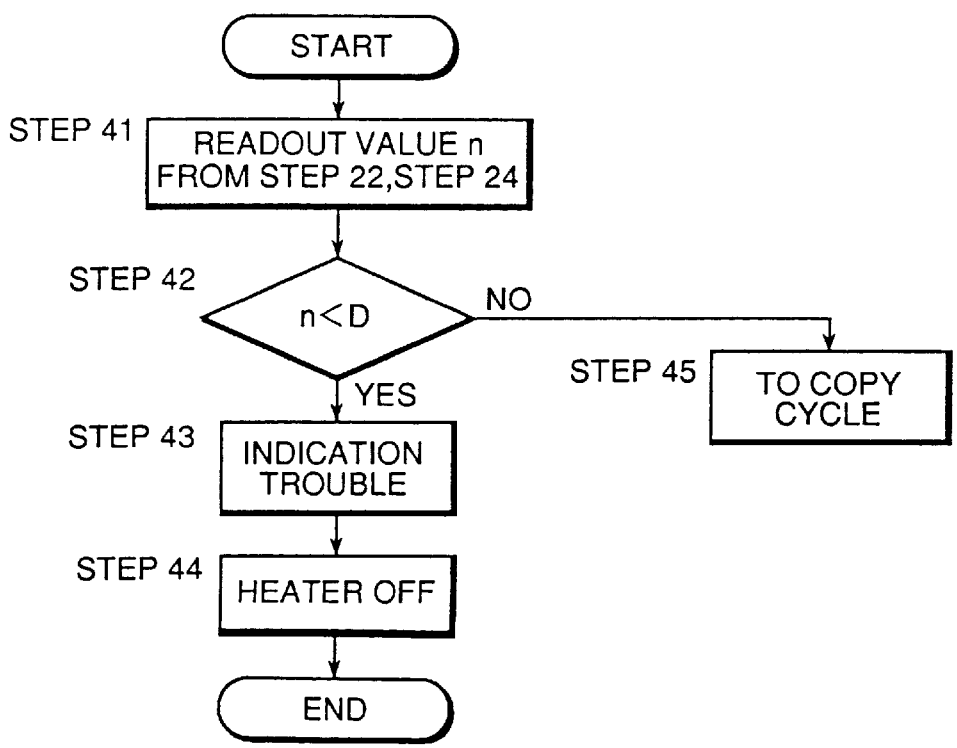
FIG. 12 is a control flowchart according to one embodiment of the image forming device of the present invention.

The present embodiment is aimed at preventing such disorder. The details will be explained hereinafter with reference to the flowchart of FIG. 12.

Similar to the steps disclosed in embodiment 4, the number of alternating current half-waves n is read out in Step 41. Then, in Step 42, determination is made on whether the value n falls below the minimum value D. If it is not below D, then procedure is advanced to Step 45, where it returns to the copying cycle. If it falls below D, procedure is advanced to Step 43 where trouble display is performed, and in Step 44, the heater lamp 1 is turned off.

Accordingly, by monitoring the calculation results of the alternating current half-waves n in FIG. 10, determination of trouble could be made before the temperature actually decreases. Therefore, fixing disorder caused by low fixing temperature could be prevented.

EMBODIMENT 6

The heat quantity taken from the fixing device is controlled by the paper passing through the fixing device. Therefore, by setting the maximum value C and the minimum value D for determining trouble disclosed in embodiments 4 and 5 for every paper size, the determination accuracy could be improved some more.

Figure 13:
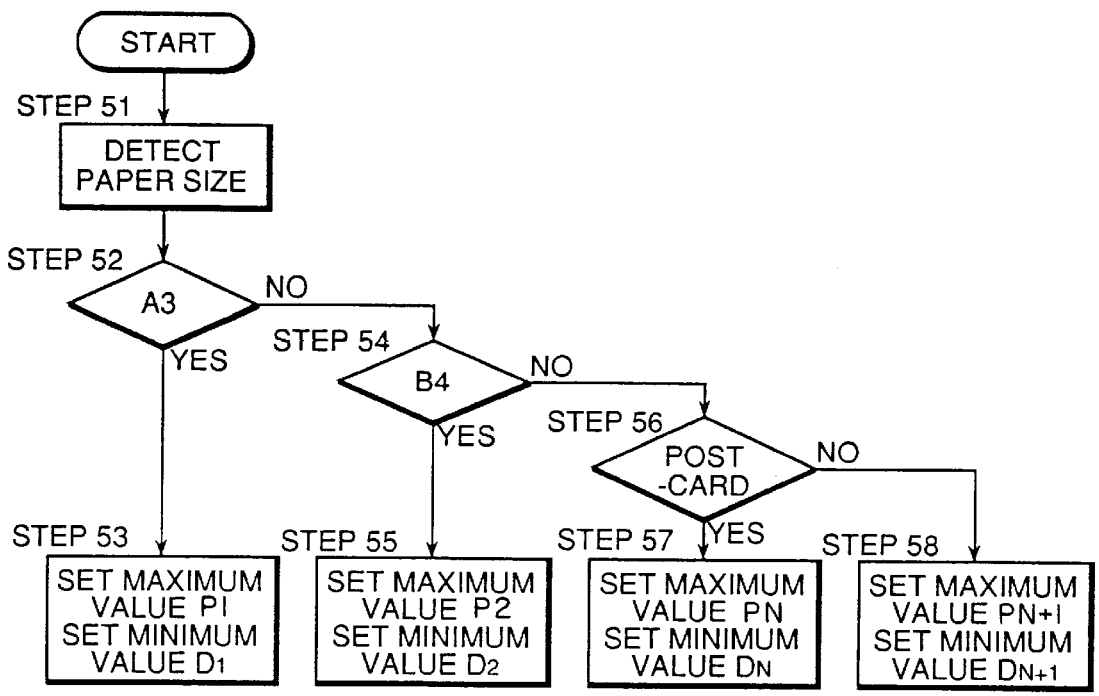
FIG. 13 is a control flowchart according to one embodiment of the image forming device of the present invention.

The explanation of the present embodiment is performed hereinafter with reference to the flowchart of FIG. 13. First, in Step 51, the paper size set for copying is detected. As the detection method, methods such as detecting by the sensor mounted on each of the paper cassette, mounting a protrusion to the paper cassette side where said protrusion presses the switch formed on the body when inserting said paper cassette, or measuring the paper length during conveyance could be performed. Such method is not directly related to the present invention, and the detailed description thereof is eliminated.

In Step 52, determination is made whether the detected paper size is A3 size or not, and if it is A3 size, the maximum power value $P_1$ and the minimum power value $D_1$ corresponding to said size is set at Step 53. If it is not A3 size, then procedure is advanced to Step 54.

Similarly as in Step 54, determination is made whether the detected paper size is B4 size or not in Step 54, and if it is B4 size, the maximum power value $P_2$ and the minimum power value $D_2$ corresponding to said size is set at Step 55. If it is not B4 size, then procedure is advanced for determination of other paper sizes.

Finally, the paper size is determined whether it is a postcard size or not (step 56).

When the paper size is determined to be a postcard size in step 56, then the procedure is advanced to step 57, where the maximum power value is set to $P_N$ and the minimum power value is set to $D_N$, which corresponds to the paper of a postcard size. If the paper size does not have a postcard size, then the procedure is advanced to step 58, where the maximum power value is set to $P_{N+1}$ and the minimum power value is set to $D_{N+1}$, which is either the same as the power for the postcard size paper or somewhat smaller.

The paper size determination is advanced in steps from size A3, B4, . . . , postcard, and below post card size. For each paper size, a maximum power value and a minimum power value corresponding thereto is set.

EMBODIMENT 7

As was explained above, the heat quantity taken away from the fixing device is controlled (ruled) by the paper to be passed through the fixing device. On the other hand, the power to be supplied will be affected greatly not only by the number of alternating current half-waves, but also by the input voltage value from the commercial power source.

The heat quantity to be supplied is in direct proportion to the watt-hour (Wh) which is a power quantity per one hour. When utilizing a halogen lamp as the heater, the relation between the electric power $W_0$ at the time the input voltage is $V_0$, and the electric power W at the time the input voltage is V could be represented as follows.

$$W/W_0 = (V/V_0)^{1.54}$$

From the above formula, the electric power ratio per each voltage, in the case where the electric power is set to be 100% when the input voltage is 100V (100%), could be shown as the following Table 1.

TABLE 1

| Input Voltage (V) | Power Ratio (%) | Compensation Coefficient |
|---|---|---|
| 80 | 71 | 1.41 |
| 90 | 85 | 1.18 |
| 100 | 100 | 1.00 |
| 110 | 116 | 0.86 |
| 120 | 120 | 0.76 |

The compensation coefficient is the reciprocal of each power ratio of the power at the input of 100V and at the other input voltages. By multiplying each compensation coefficient to the power value at 100V, the same power as the power when inputting 100V could be obtained for each of the input voltage.

Further, some of the methods for measuring the voltage value $V_i$ of the commercial power source are as follows. In one method, a frequency voltage alternating circuit is provided in the DC power source circuit 15, and the power source frequency is obtained from the voltage, and then the power source voltage after rectification is divided, and the power source voltage is measured by a comparison circuit or an analog conversion circuit. In another method the DC power source circuit 15 is divided for each commercial power source, and a dip switch or a jumper is provided in the DC power source circuit 15, and the information is read out by the microcomputer in the control circuit. Yet in another method the information is stored in a memory such as RAM not shown in the control circuit 4 in advance by a diagnosis program and the like. These and other methods are known in the art, and therefore, the detailed description thereof is eliminated.

Figure 14:
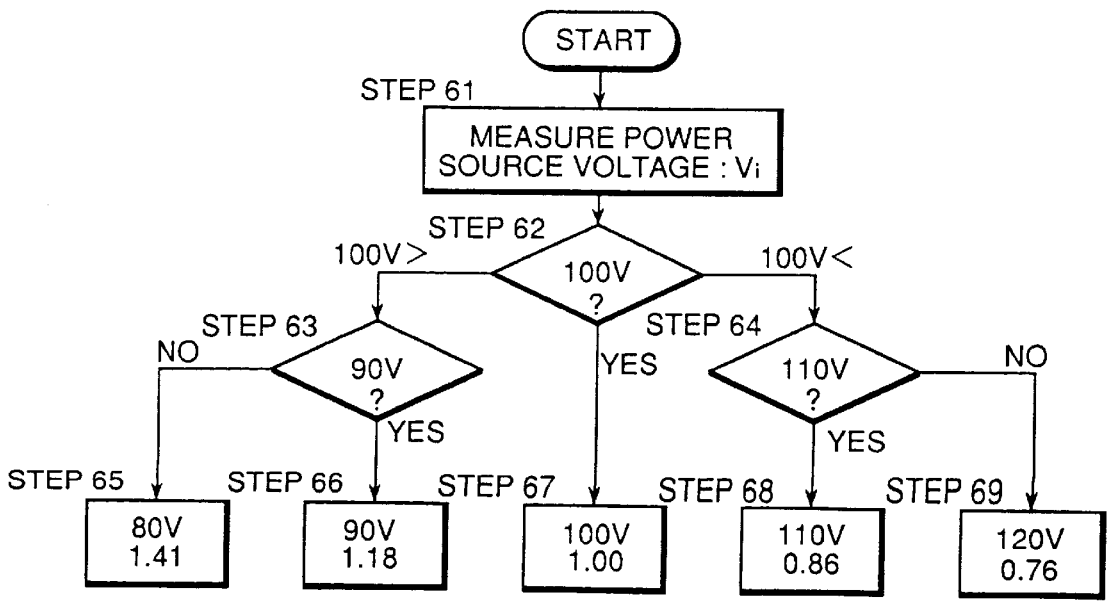
FIG. 14 is a control flowchart according to one embodiment of the image forming device of the present invention.

The present embodiment is explained below with reference to the flowchart of FIG. 14. In Step 61, the voltage value $V_i$ of the commercial power source inputted to the device is measured. In Step 62, determination is made on whether the measured voltage is 100V or not. If the measured voltage is equal to 100V, the procedure is advanced to Step 67, and the compensation coefficient is set to 1.00. If the voltage is less than 100V, then procedure is advanced to Step 63, and if exceeding 100V, it is advanced to Step 64.

If the measured voltage is not 90V in Step 63, then procedure is advanced to Step 65 where input voltage is 80V and the compensation coefficient is 1.41. If the voltage is 90V, then procedure advances to Step 66, where compensation coefficient is 1.18.

On the other hand, if the measured voltage is 110V in Step 64, then procedure is advanced to Step 68 where the compensation coefficient is set to 0.86. If the voltage is not 110V, then procedure is advanced to Step 69 where the voltage is 120V, and the compensation coefficient is 0.76.

As was explained above, by compensating the reference power n in the flowchart of FIG. 10 according to each commercial power source, the reference voltage could be set automatically for each differing commercial power source, and the varieties could be unified.

EMBODIMENT 8

Figure 15:
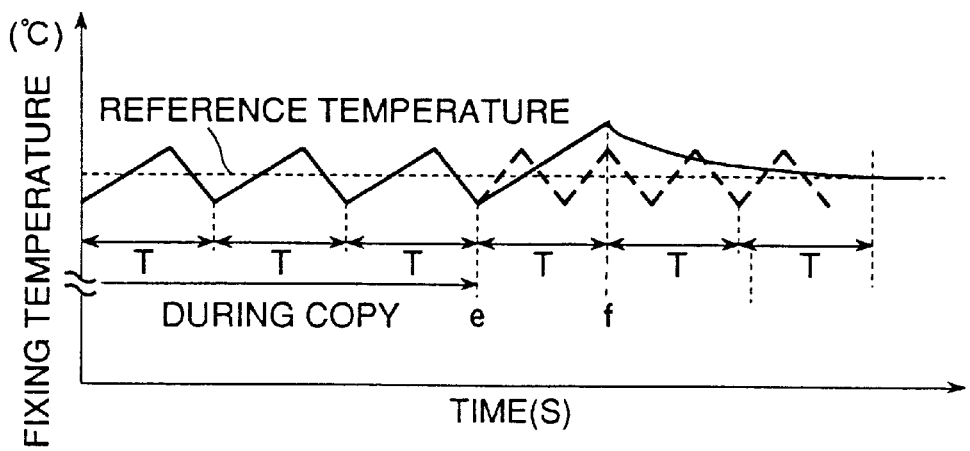
FIG. 15 is a diagram showing the relation between the fixing temperature and time according to one embodiment of the image forming device of the present invention.

A stable temperature control could be performed by adjusting the number n of alternating current half-waves supplied for every fixed cycle T during copying operation, as disclosed in embodiment 1. However, as shown in FIG. 15, from the termination of copying operation (point e of FIG. 15), the fixing temperature between the points e through f in the drawing will keep rising since no heat will be taken away by the papers being copied.

Therefore, by switching the fixing temperature control method from the method of embodiment 1 (hereinafter called the first control method) to the method of the present embodiment (hereinafter called the second control method) from the point of copy termination (the point where the last sheet is discharged), said problem could be prevented.

The second control method is a method for controlling the drive of the heater lamp 1 by an upper limit value $t_1$ and a lower limit value $t_2$ set with respect to a reference temperature $t_0$. It is a control method applying the zero-cross control method known generally in the art.

Figure 16:
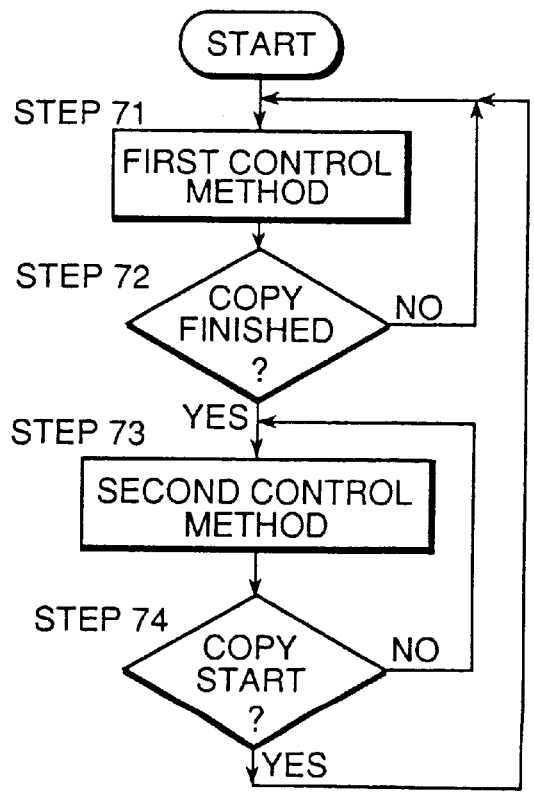
FIG. 16 is a control flowchart according to one embodiment of the image forming device of the present invention.

The present embodiment is explained below with reference to the flowchart of FIG. 16. In Step 71, the first control method is set, and in Step 72, determination is made on whether the copy is terminated or not. If the copy is terminated, procedure advances to Step 73, and if not, returns to Step 71.

In Step 73, the second control method is set as the control method. Then, in Step 74, determination is made on whether the copy is started or not. If copy is not started, then procedure returns to Step 73, and if copy is started, procedure returns to Step 71, where the control method is set to the first control method.

EMBODIMENT 9

Figure 17:
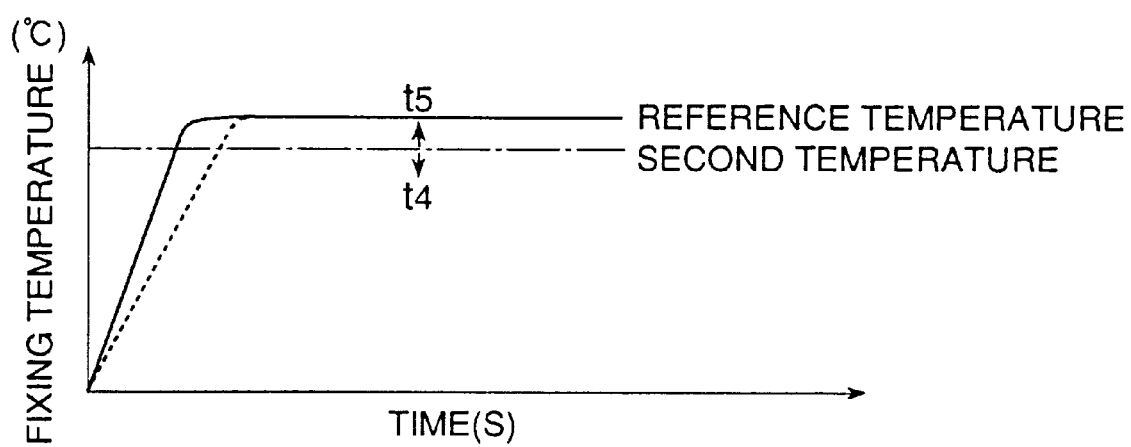
FIG. 17 is a diagram showing the relation between the fixing device and time according to one embodiment of the image forming device of the present invention.

When turning on the power of the image forming device in a printer and the like, the fixing device is in a cooled state. Therefore, the alternating current half-waves to be applied to the heater lamp 1 should be provided during all interval of the cycle T. However, when the copying operation is started just after the electric power is turned on, and when the control method is set to the first method, the alternating current half-waves corresponding to the paper size will be applied. Therefore, the rising of the fixing device temperature will be delayed, as shown in FIG. 17.

Therefore, by setting the control method to the second method at the time of switching-on of the power, and continuously providing power to the heater lamp 1 until it reaches the second reference temperature, the rising rate of the fixing device temperature could be increased, and by setting the first control method after reaching the second reference temperature, overshooting of the fixing device temperature could be reduced. The second reference temperature should be set to a temperature exceeding the minimum fixable temperature.

Figure 18:
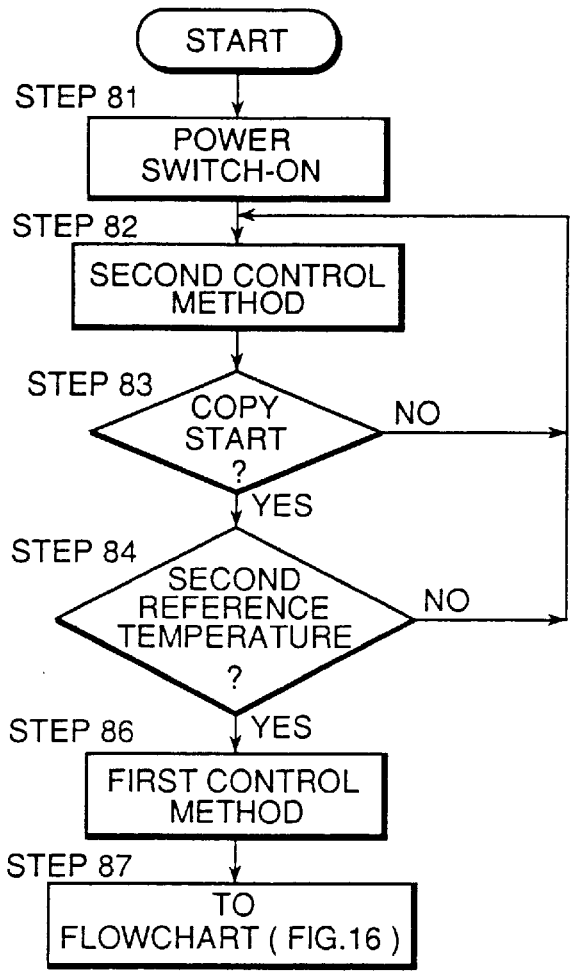
FIG. 18 is a control flowchart according to one embodiment of the image forming device of the present invention.

The present embodiment will be explained hereinafter using the flowchart of FIG. 18. In Step 81, the power is turned on, and in Step 82, the fixing temperature control is set to the second control method.

Next, in Step 83, determination is made on whether the copy is started or not, and if it is not started, procedure returns to Step 82, and if started, procedure advanced to Step 84, where determination is made on whether the fixing temperature has reached the second reference temperature or not. If not, then procedure returns to Step 82, and if it has reached the temperature, then procedure is advanced to Step 86, where the fixing temperature control is set to the first control method, and at the same time, returns to the flowchart of FIG. 16 (Step 87).

EMBODIMENT 10

In embodiment 9, when the power source voltage supplied to the device is higher than a rated value, the rising rate of the fixing temperature becomes rapid, and may bring on overshooting. Therefore, in order to ease such overshooting, the commercial power source voltage should be measured at the time of power switch-on, and when the measured voltage is higher than a predetermined value, the second reference temperature should be reduced to a lower value as shown in t4 of FIG. 17, and if the measured voltage is lower than a predetermined value, then the second reference temperature should be reset to a lower value as shown in t5.

The explanation referring to a flowchart is omitted for the present embodiment.

EMBODIMENT 11

The device itself is in a cooled state just after the power switch-on of the device, so if the temperature of the upper heat roll 6 reaches a predetermined value, there may be cases where a good fixing property could not be obtained. Therefore, as for the predetermined number of sheets after the start of the copying operation (in the present invention, initial 20 sheets), the temperature is set to a higher range with respect to the reference temperature (180° C. for example) during continuous copying, in order to prevent the above-mentioned problem.

Figure 19:
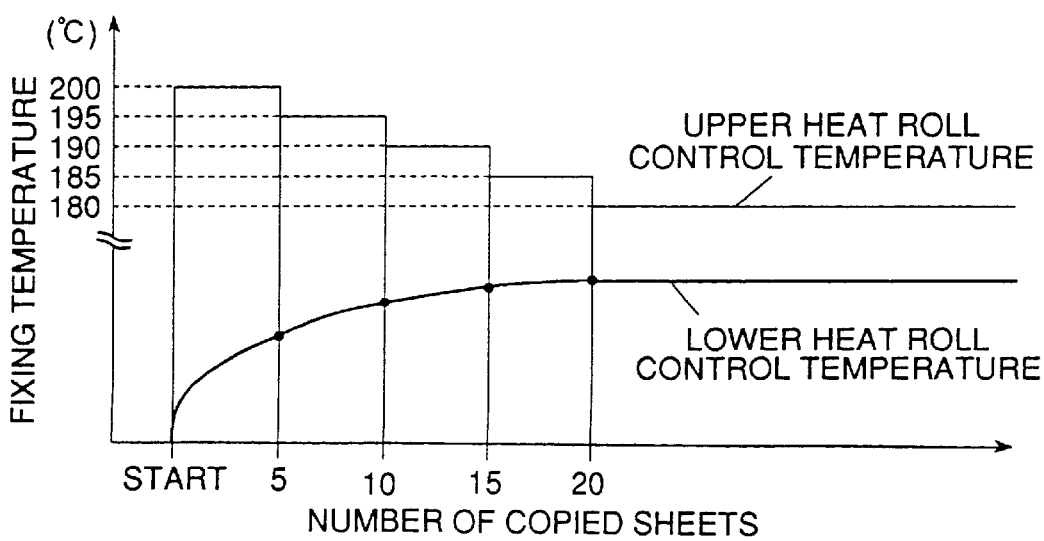
FIG. 19 is a diagram showing the relation between the number of copied sheets and the fixing temperature according to one embodiment of the image forming device of the present invention.

FIG. 19 shows the relation between the number of copied sheets from the starting of the copy, the control temperature of the upper heat roll 6, and the rising temperature of the lower heat roll 7. As shown in FIG. 19, the first five sheets of paper from the starting of the copy is copied at a fixing temperature of 200° C., and the next five sheets is copied at 190° C. Thereafter, the fixing temperature will be lowered by 5° C. for every five sheets of paper being copied. At the twentieth paper being copied, the fixing temperature is set to 180° C., and after the twentieth sheet, the fixing temperature is fixed to 180° C.

This control curve is dependent on the temperature rise curve of the lower heat roll 7, and in the present embodiment, since the temperature rise of the lower heat roll 7 is saturated with the twentieth sheet, the reference temperature of the upper heat roll 6 is set so as to fix to 180° C. when the paper has counted to twenty sheets, but the control curve should be determined by the rising characters of the temperature of the lower heat roll 7, and the control method should not be limited to the present embodiment method.

Further, the temperature control of the upper heat roll 6 is performed along the control curve of FIG. 19. However, overshooting or undershooting may occur at the switching of every 5° C. in practice. Therefore, these should be stabilized quickly. Therefore, since the appropriate power quantity is calculated from first five sheets by such as embodiment 1, so by compensating only the power quantity worth 5° C. using said power quantity, the time needed to stabilize the fixing temperature could be reduced.

Figure 20:
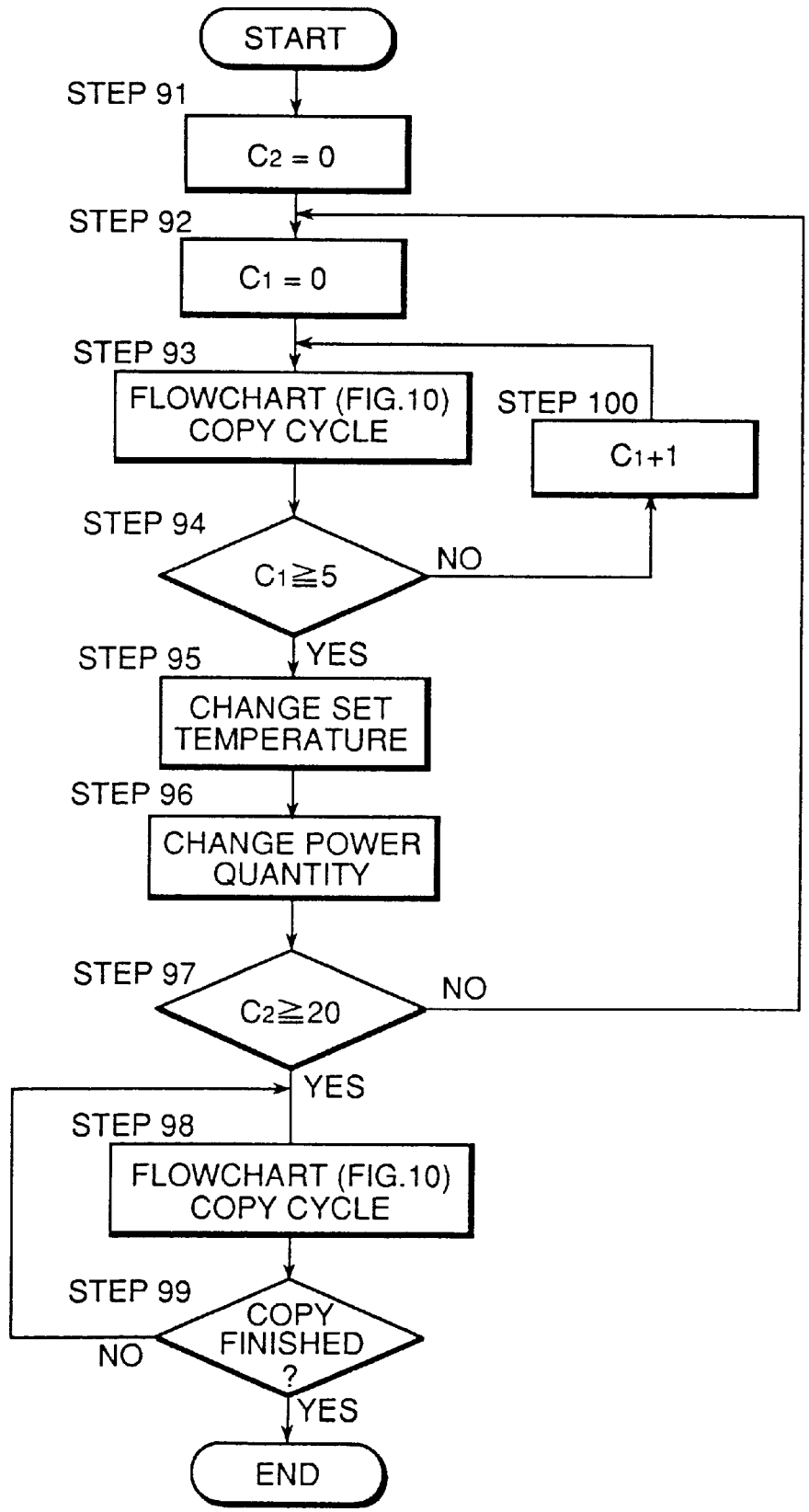
FIG. 20 is a control flowchart according to one embodiment of the image forming device of the present invention.

The flowchart of FIG. 20 is used to explain the present embodiment. At first, in Step 91 and Step 92, a copy counter $C_2$ and a copy counter $C_1$ is reset. Next, in Step 93, the copy cycle based on the flowchart of FIG. 10 is performed.

Next, in Step 94, determination is made on whether the copy counter $C_1$ exceeded 5 sheets or not. If under 5 sheets, procedure is advanced to Step 100 where +1 is added to $C_1$, and then returning to Step 93. If more than 5 sheets, procedure is advanced to Step 95 where the set temperature is lowered by 5° C. and reset to such temperature.

Then, the power quantity γ corresponding to 5° C. is subtracted from the number n of alternating current half-waves at present an set (step 96), and then procedure is advanced to Step 97 where confirmation is made on whether $C_2$ has exceeded 20 sheets or not.

If $C_2$ is under 20 sheets, then procedure is returned to Step 92, and if $C_2$ exceeds 20 sheets, then copy is performed using the flowchart of FIG. 10 (step 98), and such procedure is repeated until the termination of the copying operation (step 99).

EMBODIMENT 12

As was disclosed above, the number n of the alternating current half-waves depend greatly on the paper size, but it is also greatly influenced by the environment where the device is placed, the thickness of the paper and so on. Therefore, the present invention characterizes in calculating the best number of the alternating current half-waves by adding or subtracting some value during the copy cycle as disclosed in embodiment 1. However, only by the operation disclosed in embodiment 1, there is a problem that some time is needed before the fixing temperature is in a stable state.

Figure 21:
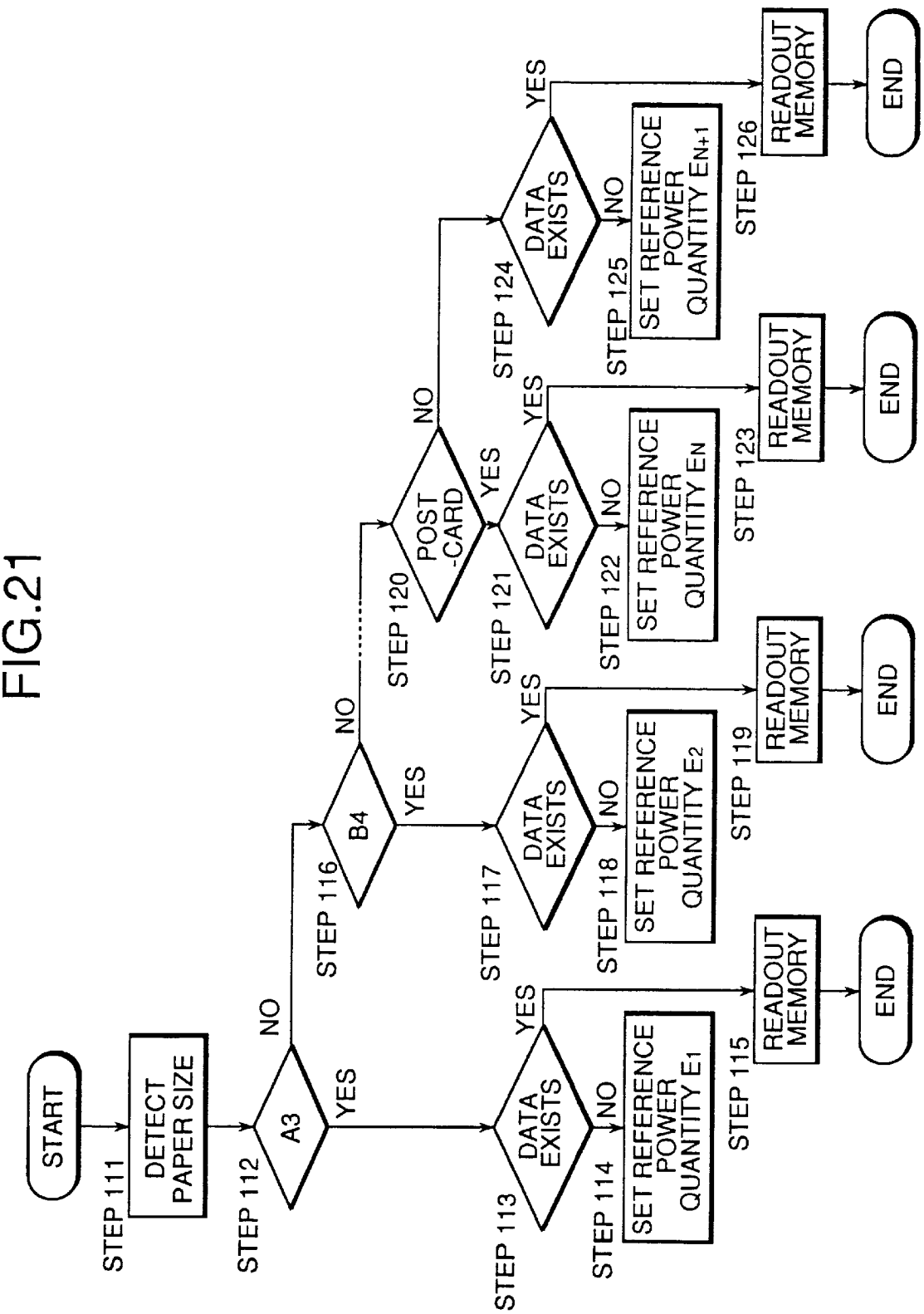
FIG. 21 is a control flowchart according to one embodiment of the image forming device of the present invention.

The present embodiment aims at solving the above problem, and shortens said necessary time. The present embodiment is explained hereinafter with reference to flowchart of FIG. 21.

At first, the paper size detection is performed in Step 111, and in Step 112, determination is made on whether the detected paper is A3 size or not. If the paper size is not A3, then procedure is advanced to Step 116, where determination is made on whether the paper size is B4 size or not. Thereafter, according to the paper size (A3, B4, . . . , postcard size), the procedure is advanced in turns from Step 112, Step 116, . . . , Step 120 and Step 124.

If the paper size is determined as A3 size in Step 112, then in Step 113, determination is made on whether the power quantity data at the time of termination of the preceding continuous copying operation exists or not in a memory means not shown. If such data exists, then said power quantity is read out (step 115), and if not, then a reference electric power quantity $E_1$ written either at the time of consignment or in a program region is readout (step 114). The process (steps 113–115; 117–119; 121–123; 124–126) executed for each of the paper sizes are the substantially the same, as such reference should be made to the foregoing process for A3 size for the other paper sizes.

It should be noted that the present invention is not limited to the embodiments disclosed above and in the accompanied drawings, but could be changed in the range of spirit of the present invention.

(1) According to the image forming device of the present invention, in the fixing temperature control of the thin heat roll having a short warm-up time, advantageous effects such as the small temperature ripple, small electronic noise of noise terminal voltage and the like could be obtained with no fear of hot-offsets and fixing disorder being generated. Further, easy solution against decreasing the electronic noise could be achieved with low cost.

(2) According to the image forming device of the present invention, by setting the reference power quantity suitable for each paper size, the overshooting and undershooting period could be shortened, enabling rapid control stability compared to the image forming device set forth in the paragraph (1). Hot-offset and fixing disorder could also be prevented, and the image quality is stabilized.

(3) According to the image forming device of the present invention, by providing the timing for switching on of the heater, the problem of the heater turning on during the copy lamp is on could be prevented, and the copied image quality of the electrophotograph copying device could be stabilized.

(4) According to the image forming device of the present invention, by rapidly Judging the continuous heating of the heater caused by device disorder and the like, the heater could be turned off before the device generates smoke and fire, which is effective in improving the reliability or safety of the device.

Further, by rapidly judging the continuous turn-off of the heater, the device could stop the copying operation before fixing disorder due to decrease in fixing temperature occurs. This is effective in preventing stain from adhering to the heat roll caused by fixing disorder, and the image quality could be stabilized.

(5) According the image forming device of the present invention, the upper limit and the lower limit is set to the power quantity suitable for each paper size in the image forming device set forth in the paragraph (4). Therefore, the judgment accuracy could be improved during temperature control, and the safety, the reliability, the prevention of stain from adhering to the heat roll could all be improved.

(6) According to the image forming device of the present invention, by automatically setting the reference electric power quantity set forth in the paragraph (1) and (2) according to each voltage of the commercial power source being detected, the increase in variety of the device according to different power source voltage could be prevented, and the productivity could be improved by unifying the device. This leads to decrease in sales stock, and realizes the cut-down of product cost.

(7) According to the image forming device of the present invention, by preventing the overshooting at the time of termination of the image forming operation, the paper stain or heat roll stain caused by hot-offset could be prevented.

(8) According to the image forming device of the present invention, compared to the image forming device set forth in the paragraph (7), the first copy time including the warm-up time could be shortened even in the case where the copying operation is performed right after turning on the power of the device which have long been turned off.

(9) According to the image forming device of the present invention, compared to the image forming device set forth in the paragraph (8), the confusion in temperature control in the case where the power source voltage is changed could be reduced. Further, the first copy time could be shortened.

(10) According to the image forming device of the present invention, fixing temperature at the time of continuous copying operation at the power switch-on could be stabilized, thereby preventing fixing disorders and hot-offsets from occurring, and stabilizing the image quality.

(11) According to the image forming device of the present invention, the fixing temperature at the time of continuous copying operation could be stabilized rapidly, thereby preventing fixing disorders and hot-offsets, and stabilizing the image quality.

I claim:

1. An image forming device comprising:
   a rotatable fixing roll arranged on a paper discharge side of a photosensitive body;
   a heating means for heating said fixing roll;
   a temperature detection means for detecting the surface temperature of said fixing roll;
   a temperature control means for controlling the fixing roll surface to maintain a predetermined temperature by supplying a predetermined electric power to said heating means based on a detection signal from said temperature detection means;
   wherein the temperature of said fixing roll during continuous image forming is detected by said temperature detection means, and said temperature control means controls an electric power quantity supplied to said heating means by increasing or decreasing a half-wave unit cycle number of a commercial power source in order to reduce the temperature difference between a predetermined reference temperature and said detected temperature; and
   wherein said temperature control means stops the supply of electric power to said heating means when the half-wave unit cycle number of the commercial power source supplied to the heating means either exceeds a predetermined upper limit value or falls below a predetermined lower limit value within a cycle.

2. An image forming device according to claim 1, wherein said temperature control means sets a reference electric power quantity to be supplied to the heating means based on each paper size, and the electric power quantity at the time to start the image forming is selected from said reference electric power quantity based on the detected paper size.

3. An image forming device according to claims 1 or 2, wherein, said temperature detection means detects the fixing roll temperature during continuous image forming for each image forming operation, and said temperature control means supplies electric power to the heating means during the time from the feeding of paper to the turning on of a copy lamp.

4. An image forming device according to claim 1, wherein the temperature control means switches said upper limit value or said lower limit value according to each paper size.

5. An image forming device comprising:
   a rotatable fixing roll arranged on a paper discharge side of a photosensitive body;
   a heating means for heating said fixing roll;
   a temperature detection means for detecting the surface temperature of said fixing roll;
   a temperature control means for controlling the fixing roll surface to maintain a predetermined temperature by supplying a predetermined electric power to said heating means based on a detection signal from said temperature detection means;
   wherein the temperature of said fixing roll during continuous image forming is detected by said temperature detection means, and said temperature control means controls an electric Power quantity supplied to said heating means by increasing or decreasing a half-wave unit cycle number of a commercial power source in order to reduce the temperature difference between a predetermined reference temperature and said detected temperature; and
   wherein the temperature control means corrects the reference electric power quantity at the time to start the image forming based on the detected commercial power source.

6. An image forming device according to claim 5, wherein said temperature control means sets a reference electric power quantity to be supplied to the heating means based on each paper size, and the electric power quantity at the time to start the image forming is selected from said reference electric power quantity based on the detected paper size.

7. An image forming device comprising:
   a rotatable fixing roll arranged on a paper discharge side of a photosensitive body;
   a heating means for heating said fixing roll;
   a temperature detection means for detecting the surface temperature of said fixing roll;

a temperature control means for controlling the fixing roll surface to maintain a predetermined temperature by supplying a predetermined power to said heating means based on a detection signal from said temperature detection means; and wherein said temperature control means comprises a first temperature control means operating during image forming, and a second temperature control means operating during standby, said first temperature control means and said second temperature control means detecting said fixing roll temperature by said temperature detection means, controlling an electric power quantity supplied to said heating means by increasing or decreasing a half-wave unit cycle number of a commercial power source in order to reduce a temperature difference between a predetermined reference temperature and said detected temperature, and said second temperature control means further controlling the power supply to said heating means having a predetermined hysteresis width with respect to said reference temperature.

8. An image forming device according to claim 7 wherein the temperature control means is switched from said second temperature control means to said first temperature control means when the temperature reaches a second reference temperature lower than the reference temperature based on the detection signal from the temperature detection means, in the case that the image forming is performed continuously from the initial rising of the heating means at switching-on of the power.

9. An image forming device according to claim 8, wherein the second reference temperature is corrected based on a detected power source voltage.

10. An image forming device according to claim 7, wherein in the control for switching the reference temperature corresponding to the image forming number of sheets from the start of the image forming operation, the difference in electric power quantity supplied to the heating means at each reference temperature is stored where said difference in electric power quantity is subtracted from the presently supplied power when switching said reference temperature.

11. An image forming device comprising:

a rotatable fixing roll arranged on a paper discharge side of a photosensitive body;

a heating means for heating said fixing roll;

a temperature detection means for detecting the surface temperature of said fixing roll;

a temperature control means for controlling the fixing roll surface to maintain a predetermined temperature by supplying a predetermined electric power to said heating means based on a detection signal from said temperature detection means;

wherein the temperature of said fixing roll during continuous image forming is detected by said temperature detection means, and said temperature control means controls an electric power quantity supplied to said heating means by increasing or decreasing a half-wave unit cycle number of a commercial power source in order to reduce the temperature difference between a predetermined reference temperature and said detected temperature; and wherein the electric power quantity supplied at the final copying operation for each of the copying paper is stored, and said stored electric power quantity is utilized as the reference electric power at the start of the next copying operation.

12. An image forming device comprising:

a rotatable fixing roll arranged on a paper discharge side of a photosensitive body;

a heating means for heating said fixing roll;

a temperature detection means for detecting the surface temperature of said fixing roll;

a temperature control means for controlling the fixing roll surface to maintain a predetermined temperature by supplying a predetermined electric power to said heating means based on a detection signal from said temperature detection means;

wherein the temperature of said fixing roll during continuous image forming is detected by said temperature detection means, and said temperature control means controls an electric power quantity supplied to said heating means by increasing or decreasing a half-wave unit cycle number of a commercial power source in order to reduce the temperature difference between a predetermined reference temperature and said detected temperature; and wherein in the control for switching the reference temperature corresponding to the image forming number of sheets from the start of the image forming operation, the difference in electric power quantity supplied to the heating means at each reference temperature is stored and said difference in electric power quantity is subtracted from the presently supplied power to the heating means when switching said reference temperature.

* * * * *